US010386921B2

(12) United States Patent
Nguyen et al.

(10) Patent No.: US 10,386,921 B2
(45) Date of Patent: Aug. 20, 2019

(54) DISPLAY OF INFORMATION ON A HEAD MOUNTED DISPLAY

(71) Applicant: Nokia Technologies Oy, Espoo (FI)

(72) Inventors: David Nguyen, Santa Clara, CA (US); Melodie Vidal, San Francisco, CA (US); Audrey Desjardins, Vancouver (CA)

(73) Assignee: Nokia Technologies Oy, Espoo (FI)

( * ) Notice: Subject to any disclaimer, the term of this patent is extended or adjusted under 35 U.S.C. 154(b) by 105 days.

(21) Appl. No.: 15/039,731

(22) PCT Filed: Dec. 3, 2013

(86) PCT No.: PCT/US2013/072770
§ 371 (c)(1),
(2) Date: May 26, 2016

(87) PCT Pub. No.: WO2015/084323
PCT Pub. Date: Jun. 11, 2015

(65) Prior Publication Data
US 2016/0378182 A1  Dec. 29, 2016

(51) Int. Cl.
*G06F 3/01* (2006.01)
*G02B 27/01* (2006.01)
(Continued)

(52) U.S. Cl.
CPC .......... *G06F 3/013* (2013.01); *G02B 27/017* (2013.01); *G02B 27/0172* (2013.01);
(Continued)

(58) Field of Classification Search
CPC .......... G09G 5/38; G09G 3/003; G02B 27/01; G02B 27/017; G02B 27/0172;
(Continued)

(56) References Cited

U.S. PATENT DOCUMENTS 5,583,795 A    12/1996  Smyth
8,913,004 B1 * 12/2014  Bozarth ............ G06K 9/00604
                                                 345/156
(Continued)

FOREIGN PATENT DOCUMENTS

JP    2012-203128 A    10/2012

OTHER PUBLICATIONS

International Search Report and Written Opinion received for corresponding Patent Cooperation Treaty Application No. PCT/US2013/72770, dated May 15, 2014, 9 pages.
(Continued)

*Primary Examiner* — Jason M Mandeville
(74) *Attorney, Agent, or Firm* — Alston & Bird LLP

(57) ABSTRACT

A method comprising precluding display of information on a head mounted display worn by a user, receiving information indicative of an eye orientation of the user, receiving information indicative of a head orientation of the user, determining that a difference between the eye orientation and a centered eye orientation exceeds a threshold eye orientation difference, determining that a difference between the head orientation and an anatomical position head orientation exceeds a threshold head orientation difference, and causing display of a representation of information on the head mounted display based, at least in part, on the determination that the eye orientation exceeds the threshold eye orientation difference from the centered eye orientation and the determination that the head orientation exceeds the threshold head orientation difference from the anatomical position head orientation is disclosed.

19 Claims, 9 Drawing Sheets

(51) Int. Cl.
*G09G 5/38* (2006.01)
*G06T 13/80* (2011.01)

(52) U.S. Cl.
CPC ......... *G02B 27/0179* (2013.01); *G06F 3/012* (2013.01); *G09G 5/38* (2013.01); *G02B 2027/014* (2013.01); *G02B 2027/0178* (2013.01); *G02B 2027/0187* (2013.01); *G06T 13/80* (2013.01)

(58) Field of Classification Search
CPC ........ G02B 27/0179; G02B 2027/0112; G02B 2027/0138; G02B 2027/014; G02B 2027/0163; G02B 2027/0178; G02B 2027/0187; G06T 13/80; G06F 3/01; G06F 3/011; G06F 3/012; G06F 3/013
USPC .......................................... 345/156–158, 7, 8
See application file for complete search history.

(56) References Cited

U.S. PATENT DOCUMENTS

| | | | | |
|---|---|---|---|---|
| 9,171,198 | B1* | 10/2015 | Raffle | G06K 9/00281 |
| 9,217,867 | B2* | 12/2015 | Nakada | G09G 3/3406 |
| 9,746,915 | B1* | 8/2017 | Raffle | G06F 3/017 |
| 2009/0303159 | A1 | 12/2009 | Gustafsson et al. | |
| 2010/0013739 | A1 | 1/2010 | Sako et al. | |
| 2010/0079356 | A1 | 4/2010 | Hoellwarth | |
| 2012/0050140 | A1 | 3/2012 | Border et al. | |
| 2012/0188148 | A1 | 7/2012 | Dejong | |
| 2012/0235902 | A1 | 9/2012 | Eisenhardt et al. | |
| 2012/0242560 | A1* | 9/2012 | Nakada | G09G 3/3406 345/8 |
| 2012/0287040 | A1 | 11/2012 | Moore et al. | |
| 2012/0327116 | A1 | 12/2012 | Liu et al. | |
| 2013/0135204 | A1 | 5/2013 | Raffle et al. | |
| 2013/0336629 | A1 | 12/2013 | Mulholland et al. | |
| 2015/0091943 | A1* | 4/2015 | Lee | G02B 27/0172 345/633 |
| 2017/0038831 | A1* | 2/2017 | Vidal | G06F 3/011 |

OTHER PUBLICATIONS

Extended European Search Report received for corresponding European Patent Application No. 13898654.2, dated May 16, 2017, 8 pages.
Office Action for European Patent Application No. 13898654.2 dated Feb. 16, 2018, 9 pages.
Office Action for European Patent Application No. 13898654.2 dated Sep. 21, 2018, 7 pages.
Office Action for Philippine Application No. 1/2016/500962 dated May 16, 2019, 7 pages.
Intention to Grant for European Application No. 13 898 654.2 dated Jun. 4, 2019, 9 pages.

* cited by examiner

| Head orientation classification 902 | Information 912 |
|---|---|
| Head orientation classification 904 | Information 914 |
| Head orientation classification 906 | Information 916 |
| Head orientation classification 908 | Information 918 |

FIG. 9A

| Eye deviation direction 922 | Information 932 |
|---|---|
| Eye deviation direction 924 | Information 934 |
| Eye deviation direction 926 | Information 936 |
| Eye deviation direction 928 | Information 938 |

FIG. 9B

| Head orientation classification 942 | Eye deviation direction 952 | Information 962 |
|---|---|---|
| Head orientation classification 942 | Eye deviation direction 954 | Information 964 |
| Head orientation classification 944 | Eye deviation direction 952 | Information 966 |
| Head orientation classification 944 | Eye deviation direction 954 | Information 968 |

FIG. 9C

DISPLAY OF INFORMATION ON A HEAD MOUNTED DISPLAY

RELATED APPLICATION

This application was originally filed as Patent Cooperation Treaty Application No. PCT/US2013/072770 filed Dec. 3, 2013.

TECHNICAL FIELD

The present application relates generally to display of information on a head mounted display.

BACKGROUND

As electronic apparatuses play an increasing role in the lives of their users, it has become increasingly desirable to allow for interaction between the user and the electronic apparatus in a manner that allows the user to perform other actions safely and without undue distraction. Additionally, it may be desire to avoid unintentional inputs associated with an electronic apparatus. For example, a user may desire to preclude an electronic apparatus from acting upon certain inputs and may desire an electronic apparatus to act upon other inputs.

SUMMARY

Various aspects of examples of the invention are set out in the claims.

One or more embodiments may provide an apparatus, a computer readable medium, a non-transitory computer readable medium, a computer program product, and a method for precluding display of information on a head mounted display worn by a user, receiving information indicative of an eye orientation of the user, receiving information indicative of a head orientation of the user, determining that a difference between the eye orientation and a centered eye orientation exceeds a threshold eye orientation difference, determining that a difference between the head orientation and an anatomical position head orientation exceeds a threshold head orientation difference, and causing display of a representation of information on the head mounted display based, at least in part, on the determination that the eye orientation exceeds the threshold eye orientation difference from the centered eye orientation and the determination that the head orientation exceeds the threshold head orientation difference from the anatomical position head orientation.

One or more embodiments may provide an apparatus, a computer readable medium, a computer program product, and a non-transitory computer readable medium having means for precluding display of information on a head mounted display worn by a user, means for receiving information indicative of an eye orientation of the user, means for receiving information indicative of a head orientation of the user, means for determining that a difference between the eye orientation and a centered eye orientation exceeds a threshold eye orientation difference, means for determining that a difference between the head orientation and an anatomical position head orientation exceeds a threshold head orientation difference, and means for causing display of a representation of information on the head mounted display based, at least in part, on the determination that the eye orientation exceeds the threshold eye orientation difference from the centered eye orientation and the determination that the head orientation exceeds the threshold head orientation difference from the anatomical position head orientation.

One or more example embodiments further perform determination that the eye orientation exceeds the threshold eye orientation difference from the centered eye orientation concurrently with the head orientation exceeding the threshold head orientation difference from the anatomical position head orientation, wherein the causation of display of the information on the head mounted display is further based, at least in part, on the determination that the eye orientation exceeds the threshold eye orientation difference from the centered eye orientation concurrently with the head orientation exceeding the threshold head orientation difference from the anatomical position head orientation.

One or more example embodiments further perform determination that the eye orientation of the user indicates that a part of the representation of the information displayed at a position on the head mounted display has been fixated upon by the user for a duration that exceeds a threshold information fixation duration, and causation of display of the part of the representation of the information at a position that is closer to a center position on the head mounted display that corresponds with the centered eye orientation.

One or more example embodiments further perform termination of display of the part of the representation of the information at the position on the head mounted display.

In at least one example embodiment, causation of display of the part of the representation of the information at the position that is closer to the center position on the head mounted display that corresponds with the centered eye orientation comprises causation of display of the part of the representation of the information at the center position on the head mounted display that corresponds with the centered eye orientation.

One or more example embodiments further perform causation of display of an animation indicating progression of display of the representation of the part of the information from the position to the center position on the head mounted display.

In at least one example embodiment, the determination that the eye orientation exceeds the threshold eye orientation difference from the centered eye orientation comprises determination that a difference between the eye orientation and a centered eye orientation exceeds a threshold eye orientation difference, and that the eye orientation differs from the centered eye orientation in an eye deviation direction from the centered eye orientation, and further comprising determination of the information based, at least in part, on the eye deviation direction.

In at least one example embodiment, the eye deviation direction identifies a direction of deviation of the eye orientation from the centered eye orientation.

In at least one example embodiment, the eye deviation direction is a direction characterized by elevation of an eye from the centered eye orientation.

In at least one example embodiment, the eye deviation direction is a direction characterized by depression of an eye from the centered eye orientation.

In at least one example embodiment, the eye deviation direction is a direction characterized by adduction of an eye from the centered eye orientation.

In at least one example embodiment, the eye deviation direction is a direction characterized by abduction of an eye from the centered eye orientation.

In at least one example embodiment, the eye deviation direction is a direction characterized by rightward movement of an eye from the centered eye orientation.

In at least one example embodiment, the rightward movement of the eye is characterized by at least one of abduction of a right eye from the centered eye orientation or adduction of a left eye from the centered eye orientation.

In at least one example embodiment, the eye deviation direction is a direction characterized by leftward movement of an eye from the centered eye orientation.

In at least one example embodiment, the leftward movement of the eye is characterized by at least one of adduction of a right eye from the centered eye orientation or abduction of a left eye from the centered eye orientation.

In at least one example embodiment, the eye deviation direction is a direction characterized by abduction and elevation of an eye from the centered eye orientation.

In at least one example embodiment, the eye deviation direction is a direction characterized by adduction and depression of an eye from the centered eye orientation.

In at least one example embodiment, the determination that the head orientation exceeds the threshold head orientation difference from the anatomical position head orientation comprises determination that a difference between the head orientation and an anatomical position head orientation exceeds a threshold head orientation difference, and that the head orientation corresponds with a head orientation classification, and further comprising determination of the information based, at least in part, on the head orientation classification.

In at least one example embodiment, the head orientation classification identifies the head orientation as an orientation associated with flexion of the neck from the anatomical position head orientation.

In at least one example embodiment, the head orientation classification identifies the head orientation as an orientation associated with extension of the neck from the anatomical position head orientation.

In at least one example embodiment, the head orientation classification identifies the head orientation as an orientation associated with leftward lateral rotation of the neck from the anatomical position head orientation.

In at least one example embodiment, the head orientation classification identifies the head orientation as an orientation associated with rightward lateral rotation of the neck from the anatomical position head orientation.

In at least one example embodiment, the head orientation classification identifies the head orientation as an orientation associated with forward deviation of the neck from the anatomical position head orientation.

In at least one example embodiment, the head orientation classification identifies the head orientation as an orientation associated with rearward deviation of the neck from the anatomical position head orientation.

In at least one example embodiment, the head orientation classification identifies the head orientation as an orientation associated with leftward lateral flexion of the neck from the anatomical position head orientation.

In at least one example embodiment, the head orientation classification identifies the head orientation as an orientation associated with rightward lateral flexion of the neck from the anatomical position head orientation.

In at least one example embodiment, the head orientation classification identifies the head orientation as an orientation associated with rearward deviation and extension of the neck from the anatomical position head orientation.

In at least one example embodiment, the head orientation classification identifies the head orientation as an orientation associated with leftward lateral rotation and flexion of the neck from the anatomical position head orientation.

In at least one example embodiment, the head orientation classification identifies the head orientation as an orientation associated with rightward lateral flexion, rightward lateral rotation, and forward deviation of the neck from the anatomical position head orientation.

One or more example embodiments further perform determination of the eye orientation of the user.

In at least one example embodiment, the information indicative of the eye orientation is eye orientation sensor information.

In at least one example embodiment, the eye orientation sensor information is information received from at least one of an optical sensor, an imaging sensor, or a magnetometer sensor.

One or more example embodiments further perform determination of the head orientation of the user.

In at least one example embodiment, the information indicative of the head orientation is head orientation sensor information.

In at least one example embodiment, the head orientation sensor information is information received from at least one of a magnetometer sensor, a gyroscope sensor, an accelerometer sensor, an orientation sensor, a myoelectric sensor, an optical sensor, or an imaging sensor.

One or more example embodiments further perform determination of the centered eye orientation based, at least in part, on information indicative of an eye orientation of the user while at least one of the user's eyes is oriented in a primary position of the eye of the user.

One or more example embodiments further perform determination of the threshold eye orientation difference based, at least in part, on the eye orientation and the centered eye orientation.

One or more example embodiments further perform determination of the anatomical position head orientation based, at least in part, on information indicative of a head orientation of the user while the user's head is oriented such that the head is facing forwards and the user's neck is erect.

One or more example embodiments further perform determination of the threshold head orientation difference based, at least in part, on the head orientation and the anatomical position head orientation.

In at least one example embodiment, the eye orientation is a spatial orientation of the eye of the user.

In at least one example embodiment, the centered eye orientation is an orientation indicative of a primary position of the eye of the user.

In at least one example embodiment, the primary position is a natural resting position of the eye of the user.

In at least one example embodiment, the threshold eye orientation difference is an amount of difference between the eye orientation and the centered eye orientation beyond which it may be desirable to infer an intent of a user.

In at least one example embodiment, the head orientation is a spatial orientation of the head of the user.

In at least one example embodiment, the anatomical position head orientation is an orientation of the head of the user such that the head is facing forwards and the user's neck is erect.

In at least one example embodiment, the threshold head orientation difference is an amount of difference between the head orientation and the anatomical position head orientation beyond which it may be desirable to infer an intent of a user.

BRIEF DESCRIPTION OF THE DRAWINGS

For a more complete understanding of embodiments of the invention, reference is now made to the following descriptions taken in connection with the accompanying drawings in which:

FIGS. 9A-9C are diagrams illustrating information correlation tables according to at least one example embodiment.

DETAILED DESCRIPTION OF THE DRAWINGS

Figure 1:
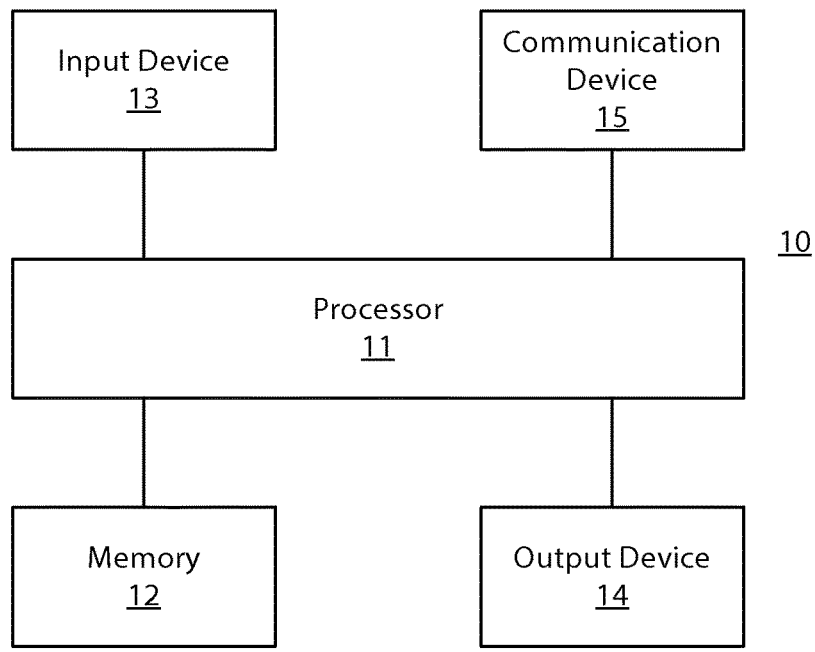
FIG. 1 is a block diagram showing an apparatus according to at least one example embodiment.

An embodiment of the invention and its potential advantages are understood by referring to FIGS. 1 through 10 of the drawings.

Some embodiments will now be described more fully hereinafter with reference to the accompanying drawings, in which some, but not all, embodiments are shown. Various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network apparatus, other network apparatus, and/or other computing apparatus.

As defined herein, a "non-transitory computer-readable medium," which refers to a physical medium (e.g., volatile or non-volatile memory device), can be differentiated from a "transitory computer-readable medium," which refers to an electromagnetic signal.

FIG. 1 is a block diagram showing an apparatus, such as an electronic apparatus 10, according to at least one example embodiment. It should be understood, however, that an electronic apparatus as illustrated and hereinafter described is merely illustrative of an electronic apparatus that could benefit from embodiments of the invention and, therefore, should not be taken to limit the scope of the invention. While electronic apparatus 10 is illustrated and will be hereinafter described for purposes of example, other types of electronic apparatuses may readily employ embodiments of the invention. Electronic apparatus 10 may be a personal digital assistant (PDAs), a pager, a mobile computer, a desktop computer, a television, a gaming apparatus, a laptop computer, a tablet computer, a media player, a camera, a video recorder, a mobile phone, a global positioning system (GPS) apparatus, an automobile, a kiosk, an electronic table, and/or any other types of electronic systems. Moreover, the apparatus of at least one example embodiment need not be the entire electronic apparatus, but may be a component or group of components of the electronic apparatus in other example embodiments. For example, the apparatus may be an integrated circuit, a set of integrated circuits, and/or the like.

Furthermore, apparatuses may readily employ embodiments of the invention regardless of their intent to provide mobility. In this regard, even though embodiments of the invention may be described in conjunction with mobile applications, it should be understood that embodiments of the invention may be utilized in conjunction with a variety of other applications, both in the mobile communications industries and outside of the mobile communications industries. For example, the apparatus may be, at least part of, a non-carryable apparatus, such as a large screen television, an electronic table, a kiosk, an automobile, and/or the like.

In at least one example embodiment, electronic apparatus 10 comprises processor 11 and memory 12. Processor 11 may be any type of processor, controller, embedded controller, processor core, and/or the like. In at least one example embodiment, processor 11 utilizes computer program code to cause an apparatus to perform one or more actions. Memory 12 may comprise volatile memory, such as volatile Random Access Memory (RAM) including a cache area for the temporary storage of data and/or other memory, for example, non-volatile memory, which may be embedded and/or may be removable. The non-volatile memory may comprise an EEPROM, flash memory and/or the like. Memory 12 may store any of a number of pieces of information, and data. The information and data may be used by the electronic apparatus 10 to implement one or more functions of the electronic apparatus 10, such as the functions described herein. In at least one example embodiment, memory 12 includes computer program code such that the memory and the computer program code are configured to, working with the processor, cause the apparatus to perform one or more actions described herein.

The electronic apparatus 10 may further comprise a communication device 15. In at least one example embodiment, communication device 15 comprises an antenna, (or multiple antennae), a wired connector, and/or the like in operable communication with a transmitter and/or a receiver. In at least one example embodiment, processor 11 provides signals to a transmitter and/or receives signals from a receiver. The signals may comprise signaling information in accordance with a communications interface standard, user speech, received data, user generated data, and/or the like. Communication device 15 may operate with one or more air interface standards, communication protocols, modulation types, and access types. By way of illustration, the electronic communication device 15 may operate in accordance with second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), and/or with fourth-generation (4G) wireless communication protocols, wireless networking protocols, such as 802.11, short-range wireless protocols, such as Bluetooth, and/or the like. Communication device 15 may operate in accordance with wireline protocols, such as Ethernet, digital subscriber line (DSL), asynchronous transfer mode (ATM), and/or the like.

Processor 11 may comprise means, such as circuitry, for implementing audio, video, communication, navigation, logic functions, and/or the like, as well as for implementing embodiments of the invention including, for example, one or more of the functions described herein. For example, processor 11 may comprise means, such as a digital signal processor device, a microprocessor device, various analog to digital converters, digital to analog converters, processing circuitry and other support circuits, for performing various functions including, for example, one or more of the functions described herein. The apparatus may perform control and signal processing functions of the electronic apparatus 10 among these devices according to their respective capabilities. The processor 11 thus may comprise the functionality to encode and interleave message and data prior to modulation and transmission. The processor 1 may additionally comprise an internal voice coder, and may comprise an internal data modem. Further, the processor 11 may comprise functionality to operate one or more software programs, which may be stored in memory and which may, among other things, cause the processor 11 to implement at least one embodiment including, for example, one or more of the functions described herein. For example, the processor 11 may operate a connectivity program, such as a conventional internet browser. The connectivity program may allow the electronic apparatus 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic apparatus 10 may comprise a user interface for providing output and/or receiving input. The electronic apparatus 10 may comprise an output device 14. Output device 14 may comprise an audio output device, such as a ringer, an earphone, a speaker, and/or the like. Output device 14 may comprise a tactile output device, such as a vibration transducer, an electronically deformable surface, an electronically deformable structure, and/or the like. Output device 14 may comprise a visual output device, such as a display, a light, and/or the like. In at least one example embodiment, the apparatus causes display of information, the causation of display may comprise displaying the information on a display comprised by the apparatus, sending the information to a separate apparatus that comprises a display, and/or the like. The electronic apparatus may comprise an input device 13. Input device 13 may comprise a light sensor, a proximity sensor, a microphone, a touch sensor, a force sensor, a button, a keypad, a motion sensor, a magnetic field sensor, a camera, and/or the like. A touch sensor and a display may be characterized as a touch display. In an embodiment comprising a touch display, the touch display may be configured to receive input from a single point of contact, multiple points of contact, and/or the like. In such an embodiment, the touch display and/or the processor may determine input based, at least in part, on position, motion, speed, contact area, and/or the like. In at least one example embodiment, the apparatus receives an indication of an input. The apparatus may receive the indication from a sensor, a driver, a separate apparatus, and/or the like. The information indicative of the input may comprise information that conveys information indicative of the input, indicative of an aspect of the input indicative of occurrence of the input, and/or the like.

The electronic apparatus 10 may include any of a variety of touch displays including those that are configured to enable touch recognition by any of resistive, capacitive, infrared, strain gauge, surface wave, optical imaging, dispersive signal technology, acoustic pulse recognition or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display. A touch display may be capable of receiving information associated with force applied to the touch screen in relation to the touch input. For example, the touch screen may differentiate between a heavy press touch input and a light press touch input. In at least one example embodiment, a display may display two-dimensional information, three-dimensional information and/or the like.

In embodiments including a keypad, the keypad may comprise numeric (for example, 0-9) keys, symbol keys (for example, #, *), alphabetic keys, and/or the like for operating the electronic apparatus 10. For example, the keypad may comprise a conventional QWERTY keypad arrangement. The keypad may also comprise various soft keys with associated functions. In addition, or alternatively, the electronic apparatus 10 may comprise an interface device such as a joystick or other user input interface.

Input device 13 may comprise a media capturing element. The media capturing element may be any means for capturing an image, video, and/or audio for storage, display or transmission. For example, in at least one example embodiment in which the media capturing element is a camera module, the camera module may comprise a digital camera which may form a digital image file from a captured image. As such, the camera module may comprise hardware, such as a lens or other optical component(s), and/or software necessary for creating a digital image file from a captured image. Alternatively, the camera module may comprise only the hardware for viewing an image, while a memory device of the electronic apparatus 10 stores instructions for execution by the processor 11 in the form of software for creating a digital image file from a captured image. In at least one example embodiment, the camera module may further comprise a processing element such as a co-processor that assists the processor 11 in processing image data and an encoder and/or decoder for compressing and/or decompressing image data. The encoder and/or decoder may encode and/or decode according to a standard format, for example, a Joint Photographic Experts Group (JPEG) standard format.

Figure 2:
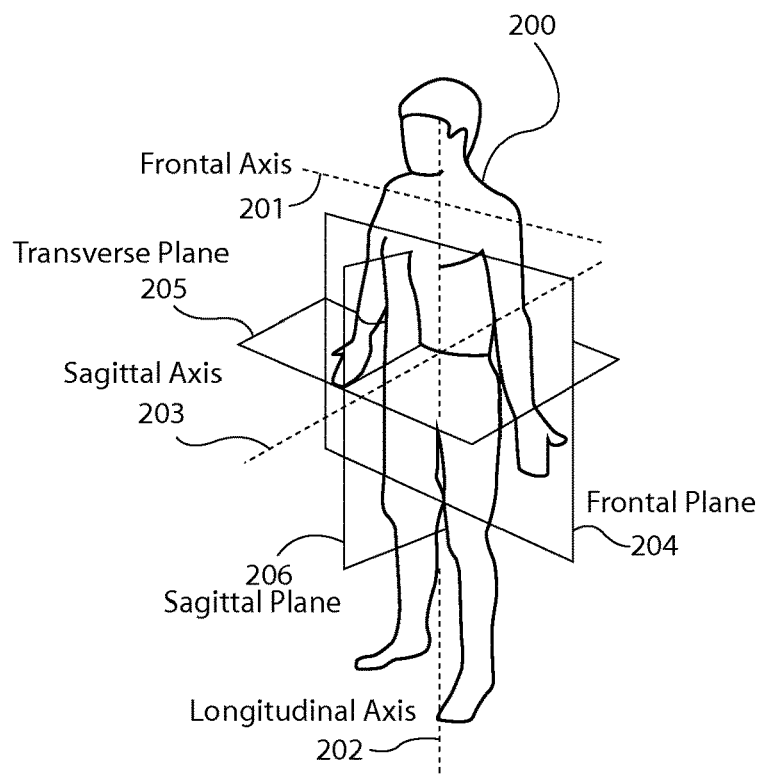
FIG. 2 is a diagram illustrating anatomical terms of location, orientation, and/or the like, with respect to a user according to at least one example embodiment.

FIG. 2 is a diagram illustrating anatomical terms of location, orientation, and/or the like, with respect to user 200. It can be seen that user 200 is depicted in an anatomic position. An anatomic position is a posture of a human body in which the body is standing with legs slightly apart with feet forward and palms facing forward.

The body of user 200 may be described in relation to three fundamental axes that are orthogonal to each other; the frontal axis, the longitudinal axis, and the sagittal axis. Frontal axis 201 is an imaginary line that extends from right to left through the center of user 200. Longitudinal axis 202 is a line that extends from superior (upper) to inferior (lower) through the center of user 200. Sagittal axis 203 is a line that extends from anterior to posterior through the center of user 200. Frontal plane 204 is a plane that divides user 200 into anterior and posterior halves along frontal axis 201 and longitudinal axis 202. It can be seen that, in the anatomical position, the frontal plane divides the head and neck of user 200 when user 200 is in the anatomic position. Transverse plane 205 is a plane that divides user 200 into superior and inferior parts through frontal axis 201 and sagittal axis 203. Sagittal plane 206 is a plane that divides user 200 into left and right parts through sagittal axis 203 and longitudinal axis 202. It can be seen that, in the anatomical position, the sagittal plane divides the head and neck of user 200 when user 200 is in the anatomic position.

In the example of FIG. 2, the head of user 200 is held such that the head is divided in half by frontal plane 204 and sagittal plane 206. The head of user 200 faces a direction parallel to sagittal axis 203. In the example of FIG. 2, the neck of user 200 is held straight and erect such that the neck is divided in half by frontal plane 204 and sagittal plane 206. The neck of user 200 is held such that the neck is centered on longitudinal axis 202. In at least one example embodiment, an orientation of the head of a user such that the head is facing forwards and the user's neck is erect may be an anatomical position head orientation. For example, FIG. 2 illustrates user 200 positioned in an anatomical position such that the head of user 200 is held in an anatomical position head orientation.

FIGS. 3A-3D are diagrams illustrating head movement, head orientation, and/or head orientation classification according to at least one example embodiment. The examples of FIGS. 3A-3D are merely examples and do not limit the scope of the claims. For example, head movement may vary, head orientation may vary, range of head movement, and/or the like.

In some circumstances, it may be desirable to identify an orientation of the head of a user based, at least in part, on movement of the user's head and/or neck. Physical movement with respect to a head may be characterized in terms of fundamental movements. For example, a complex head movement may be characterized by the manner in which the complex movement incorporates distinct fundamental movements. FIGS. 3A-3D illustrate examples of such fundamental movements. The movements of FIGS. 3A-3D are described in relation to movement from an anatomical position head orientation, similar as may be described regarding FIG. 2.

In some circumstances, it may be desirable to identify an orientation of the head of a user based, at least in part, on a position of the user's head and/or neck. In at least one example embodiment, a head orientation is a spatial orientation of the head of the user. In some circumstances, it may be desirable to characterize such head orientations of the user. For example, it may be desirable to distinguish a head orientation from a different head orientation, to classify a head orientation as a specific head orientation, and/or the like. In at least one example embodiment, a head orientation may be identified by a head orientation classification. FIGS. 3A-3D illustrate examples of such fundamental movements. The head orientations of FIGS. 3A-3D are described with respect to an anatomical position head orientation, similar as may be described regarding FIG. 2.

Figures 3A, 3B:
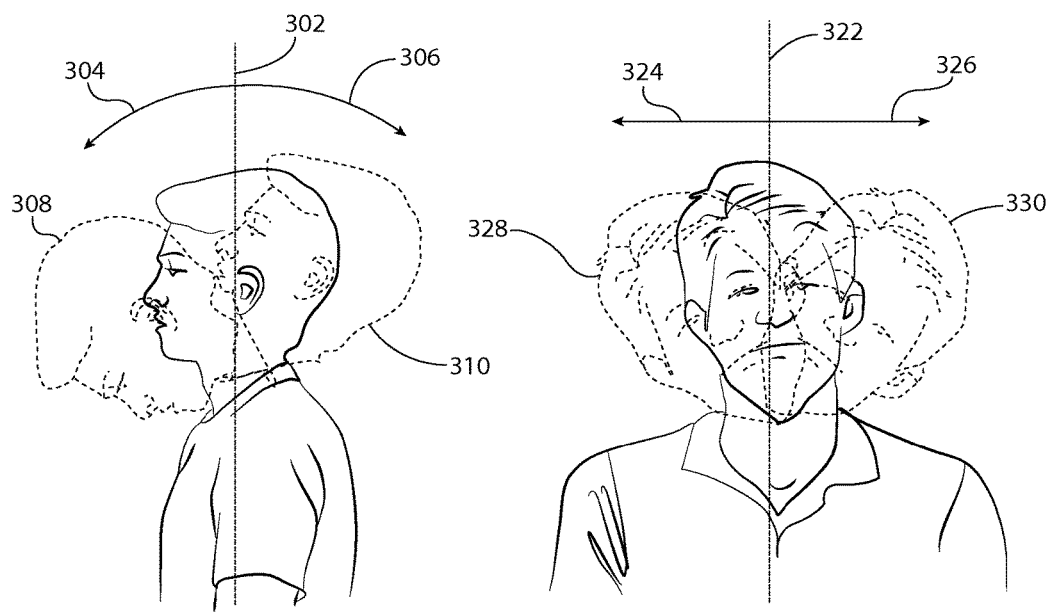
FIGS. 3A-3D are diagrams illustrating head movement, head orientation, and/or head orientation classification according to at least one example embodiment.

FIG. 3A is a diagram illustrating head orientation associated with flexion and extension of a neck from an anatomical position head orientation according to at least one example embodiment. Head orientation may be described in terms of flexion and extension of the neck of a user from an anatomical position head orientation. In the example of FIG. 3A, a user is positioned in an anatomical position such that the user's head and neck are bisected by frontal plane 302. Flexion 304 is a movement of the head and/or neck characterized by tilting of the head down from the anatomical position head orientation along the sagittal plane. Extension 306 is a movement of the head and/or neck characterized by tilting of the head up from the anatomical position head orientation along the sagittal plane. In at least one example embodiment, a head orientation classification identifies a head orientation as an orientation associated with flexion of the neck from an anatomical position head orientation. For example, in FIG. 3A, head orientation 308 illustrates a head orientation associated with flexion of the neck from an anatomical position head orientation. In at least one example embodiment, a head orientation classification identifies a head orientation as an orientation associated with extension of the neck from an anatomical position head orientation. For example, in FIG. 3A, head orientation 310 illustrates a head orientation associated with extension of the neck from an anatomical position head orientation.

FIG. 3B is a diagram illustrating head orientation associated with leftward lateral flexion and rightward lateral flexion of a neck from an anatomical position head orientation according to at least one example embodiment. Head orientation may be described in terms of leftward lateral flexion and rightward lateral flexion of the neck of a user from an anatomical position head orientation. In the example of FIG. 3B, a user is positioned in an anatomical position such that the user's head and neck are bisected by sagittal plane 322. Leftward lateral flexion 324 is a movement of the head and/or neck characterized by tilting of the head to the left from the anatomical position head orientation along the frontal plane. Rightward lateral flexion 326 is a movement of the head and/or neck characterized by tilting of the head to the right from the anatomical position head orientation along the sagittal plane. In at least one example embodiment, a head orientation classification identifies a head orientation as an orientation associated with leftward lateral flexion of the neck from an anatomical position head orientation. For example, in FIG. 3B, head orientation 328 illustrates a head orientation associated with leftward lateral flexion of the neck from an anatomical position head orientation. In at least one example embodiment, a head orientation classification identifies a head orientation as an orientation associated with rightward lateral flexion of the neck from an anatomical position head orientation. For example, in FIG. 3B, head orientation 330 illustrates a head orientation associated with rightward lateral flexion of the neck from an anatomical position head orientation.

Figures 3C, 3D:
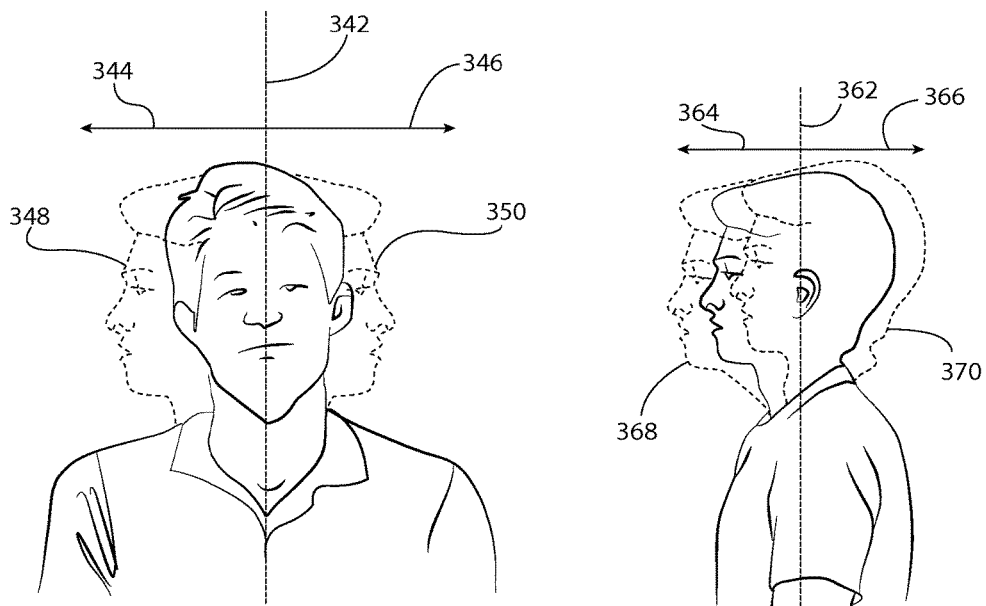

FIG. 3C is a diagram illustrating head orientation associated with leftward lateral rotation and rightward lateral rotation of a neck from an anatomical position head orientation according to at least one example embodiment. Head orientation may be described in terms of leftward lateral rotation and rightward lateral rotation of the neck of a user from an anatomical position head orientation. In the example of FIG. 3C, a user is positioned in an anatomical position such that the user's head and neck are bisected by sagittal plane 342. Leftward lateral rotation 344 is a movement of the head and/or neck characterized by rotation of the head to the left from the anatomical position head orientation along a longitudinal axis. Rightward lateral rotation 346 is a movement of the head and/or neck characterized by rotation of the head to the right from the anatomical position head orientation along a longitudinal axis. In at least one example embodiment, a head orientation classification identifies a head orientation as an orientation associated with leftward lateral rotation of the neck from an anatomical position head orientation. For example, in FIG. 3C, head orientation 348 illustrates a head orientation associated with leftward lateral rotation of the neck from an anatomical position head orientation. In at least one example embodiment, a head orientation classification identifies a head orientation as an orientation associated with rightward lateral rotation of the neck from an anatomical position head orientation. For example, in FIG. 3C, head orientation 350 illustrates a head orientation associated with rightward lateral rotation of the neck from an anatomical position head orientation.

FIG. 3D is a diagram illustrating head orientation associated with forward deviation and rearward deviation of a neck from an anatomical position head orientation according to at least one example embodiment. Head orientation may be described in terms of forward deviation and rearward deviation of the neck of a user from an anatomical position head orientation. In the example of FIG. 3D, a user is positioned in an anatomical position such that the user's head and neck are bisected by frontal plane 362. Forward deviation 364 is a movement of the head and/or neck characterized by extending of the head and/or chin outward from the anatomical position head orientation along the sagittal plane. Rearward deviation 366 is a movement of the head and/or neck characterized by withdrawing of the head and/or chin inward from the anatomical position head orientation along the sagittal plane. In at least one example embodiment, a head orientation classification identifies a head orientation as an orientation associated with forward deviation of the neck from an anatomical position head orientation. For example, in FIG. 3D, head orientation 368 illustrates a head orientation associated with forward deviation of the neck from an anatomical position head orientation. In at least one example embodiment, a head orientation classification identifies a head orientation as an orientation associated with rearward deviation of the neck from an anatomical position head orientation. For example, in FIG. 3D, head orientation 370 illustrates a head orientation associated with rearward deviation of the neck from an anatomical position head orientation.

As discussed previously, in some circumstances, it may be desirable to characterize a complex head movement by the manner in which the complex movement incorporates distinct fundamental movements. Although the examples of FIGS. 3A-3D each illustrate distinct types of fundamental movements, such movements may be combined in order to facilitate characterization of complex head movements, head orientations, and/or the like. In one example, a head orientation classification may identify a head orientation as an orientation associated with rearward deviation and extension of the neck from an anatomical position head orientation. In another example, a head orientation classification may identify a head orientation as an orientation associated with leftward lateral rotation and flexion of the neck from an anatomical position head orientation. In yet another example, a head orientation classification may identify a head orientation as an orientation associated with rightward lateral flexion, rightward lateral rotation, and forward deviation of the neck from an anatomical position head orientation.

FIGS. 4A-4E are diagrams illustrating eye movement, eye orientation, and/or eye deviation direction according to at least one example embodiment. The examples of FIGS. 4A-4E are merely examples and do not limit the scope of the claims. For example, eye movement may vary, eye orientation may vary, eye deviation direction may vary, and/or the like.

In some circumstances, it may be desirable to identify an orientation of an eye of a user based, at least in part, on movement of at least one eye of the user. Physical movement with respect to an eye may be characterized in terms of fundamental movements. For example, a complex eye movement may be characterized by the manner in which the complex movement incorporates distinct fundamental movements. FIGS. 4B-4E illustrate examples of such fundamental movements. In at least one example embodiment, a fundamental movement of an eye is a movement of the eye in an eye deviation direction. For example, the eye deviation direction may identify a direction of deviation of the eye orientation from the centered eye orientation. The movements of FIGS. 4B-4E are described in relation to movement from a centered eye orientation. In at least one example embodiment, a centered eye orientation is an orientation indicative of a primary position of an eye of a user. For example, the primary position may be a natural resting position of the eye of the user, a position of the eye associated with the user looking straight ahead, a position of the eye such that the iris is spatially centered within the eye opening, and/or the like.

In some circumstances, it may be desirable to identify an orientation of an eye of a user based, at least in part, on a position of at least one eye of the user. In at least one example embodiment, an eye orientation is a spatial orientation of an eye of a user. In some circumstances, it may be desirable to characterize such eye orientations of the user. For example, it may be desirable to distinguish an eye orientation from a different eye orientation, to classify an eye orientation as a specific eye orientation, and/or the like. In at least one example embodiment, an eye orientation may be identified by an eye deviation direction. FIGS. 4B-4E illustrate examples of such fundamental movements. The eye orientations of FIGS. 4B-4E are described with respect to a centered eye orientation.

Figure 4A:
FIGS. 4A-4E are diagrams illustrating eye movement, eye orientation, and/or eye deviation direction according to at least one example embodiment.

FIG. 4A is a diagram illustrating a centered eye orientation. In the example of FIG. 4A, eye orientation 402 is a centered eye orientation. As illustrated in the example of FIG. 4A, eye orientation 402 is an orientation in which the iris is spatially centered within the eye opening, the eyelids, and/or the like. Eye orientation 402 may be a primary position of the eye such that eye orientation 402 is associated with a natural resting position of the eye.

Figure 4B:

FIG. 4B is a diagram illustrating elevation of an eye from a centered eye orientation according to at least one example embodiment. Eye orientation may be described in terms of elevation of an eye from a centered eye orientation. Elevation 412 is a movement of the eye associated with movement of the eye upwards from the centered eye orientation. In at least one example embodiment, an eye deviation direction is a direction characterized by elevation of an eye from the centered eye orientation. For example, in FIG. 4B, eye orientation 414 illustrates an eye orientation associated with an eye deviation direction identifying a direction characterized by elevation of the eye from the centered eye orientation.

Figure 4C:

FIG. 4C is a diagram illustrating depression of an eye from a centered eye orientation according to at least one example embodiment. Eye orientation may be described in terms of depression of an eye from a centered eye orientation. Depression 422 is a movement of the eye associated with movement of the eye downwards from the centered eye orientation. In at least one example embodiment, an eye deviation direction is a direction characterized by depression of an eye from the centered eye orientation. For example, in FIG. 4C, eye orientation 424 illustrates an eye orientation associated with an eye deviation direction identifying a direction characterized by depression of the eye from the centered eye orientation.

Figure 4D:

FIG. 4D is a diagram illustrating rightward movement of an eye from a centered eye orientation according to at least one example embodiment. Eye orientation may be described in terms of rightward of an eye from a centered eye orientation. Rightward movement 432 is a movement of the eye associated with movement of the eye towards the right side of a user's body from the centered eye orientation. In at least one example embodiment, an eye deviation direction is a direction characterized by rightward movement of an eye from the centered eye orientation. In at least one example embodiment, rightward movement of an eye is characterized by abduction of a right eye from the centered eye orientation, adduction of a left eye from the centered eye orientation, and/or the like. Adduction of an eye may relate to movement of the eye to a position closer to a user's nose than a centered eye orientation. Abduction of an eye may relate to movement of the eye to a position further from a user's nose than a centered eye orientation. For example, in FIG. 4D, eye orientation 434 illustrates an eye orientation associated with an eye deviation direction identifying a direction characterized by rightward movement of the eye from the centered eye orientation.

Figure 4E:

FIG. 4E is a diagram illustrating leftward movement of an eye from a centered eye orientation according to at least one example embodiment. Eye orientation may be described in terms of leftward movement of an eye from a centered eye orientation. Leftward movement 442 is a movement of the eye associated with movement of the eye towards the left side of a user's body from the centered eye orientation. In at least one example embodiment, an eye deviation direction is a direction characterized by leftward movement of an eye from the centered eye orientation. In at least one example embodiment, leftward movement of an eye is characterized by adduction of a right eye from the centered eye orientation, abduction of a left eye from the centered eye orientation, and/or the like. For example, in FIG. 4E, eye orientation 444 illustrates an eye orientation associated with an eye deviation direction identifying a direction characterized by leftward movement of the eye from the centered eye orientation.

As discussed previously, in some circumstances, it may be desirable to characterize a complex eye movement by the manner in which the complex movement incorporates distinct fundamental movements. Although the examples of FIGS. 4B-4E each illustrate distinct types of fundamental movements, such movements may be combined in order to facilitate characterization of complex eye movements, eye orientations, eye deviation directions, and/or the like. In one example, an eye deviation direction may be a direction characterized by abduction and elevation of an eye from the centered eye orientation. In another example, an eye deviation direction may be a direction characterized by adduction and depression of an eye from the centered eye orientation.

Figure 5A:
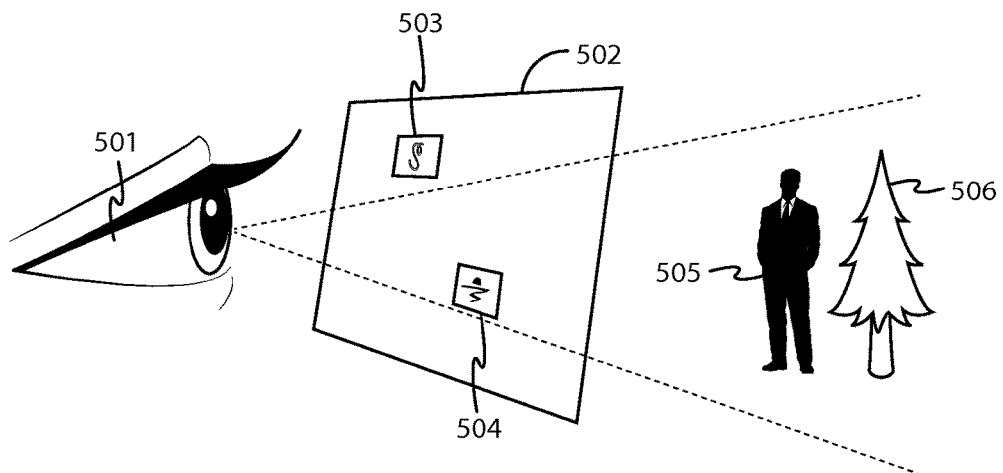
FIGS. 5A-5B are diagrams illustrating see through displays according to at least one example embodiment.
Figure 5B:
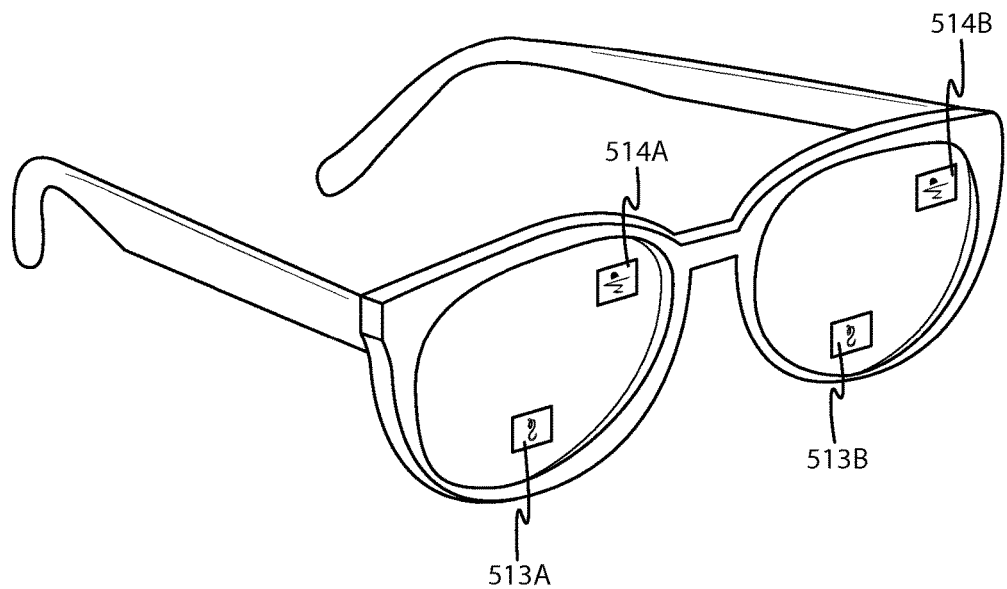

FIGS. 5A-5B are diagrams illustrating see through displays according to at least one example embodiment. The examples of FIGS. 5A-5B are merely examples and do not limit the scope of the claims. For example, configuration of the see through display may vary, relationship between the user and the see through display may vary, shape of the see through display may vary, opacity of the see through display may vary, and/or the like.

In some circumstances, it may be desirable for a display to be a see through display. In at least one example embodiment, a see through display is a display that presents information to a user, but through which objects on an opposite side of the display from the user may be seen. A see through display may be comprised by a window, a windshield, a visor, glasses, a head mounted display, and/or the like. A head mounted display may, for example, be a display that is head mountable, a display that is coupled to an element that wearable at a location on and/or proximate to the head of a user, a display that is wearable at a location on and/or proximate to the head of a user, and/or the like.

Due to the nature of a head mounted display, in some circumstances, a user may desire to avoid display of information on the head mounted display. For example, information displayed on a head mounted display may obscure one or more objects from the user when perceived through the head mounted display. In such an example, the user of the head mounted display may desire to avoid displaying information on, at least part of, the head mounted display in situations in which the user desires to avoid obscurance of objects the user may be able to view through the head mounted display. For example, in social situations, business situations, driving situations, and/or the like, the user may desire to maintain a clear field of view that is free from potentially obscuring information being displayed on the head mounted display.

In many situations, the user may desire to avoid distractions associated with display of information on a head mounted display, to avoid interruption of ongoing activities by information being displayed on a head mounted display, and/or the like. In at least one example embodiment, an apparatus may preclude display of information on a head mounted display worn by a user. For example, the apparatus may preclude display of information on the head mounted display worn by the user until certain input is received, until an indication of intent is received, in certain situations that may be detectable by the apparatus, and/or the like. In at least one example embodiment, an apparatus may default to preclusion of display of information on the head mounted display absent an indication to the contrary. For example, the apparatus may preclude display of information on the head mounted display unless such display is initiation by a user of the head mounted display, indicated by a user of the head mounted display, and/or the like. In at least one example embodiment, display of information is precluded on less than the entirety of a head mounted display. For example, display of information may be precluded in a center portion of the head mounted display, a user configurable region of the head mounted display, and/or the like. For example, display of information may be precluded in a center ninety-percent of a head mounted display such that information may be displayed along the periphery of the head mounted display. In such an example, the periphery display area may be utilized for display of status indicator, battery graphics, wireless connectivity, time, notifications, and/or the like. In another example, display of information may be precluded in a center seventy-percent of a head mounted display. In both examples, display of information may be precluded in one region and permitted in another region in order to avoid display of information in a distracting and/or obstructing manner.

In some circumstances, a user may desire to view information by way of a head mounted display. For example, upon a clear indication of a desire to view information, the user may desire the head mounted display to discontinue preclusion of display of information on the head mounted display, to allow for display of information on the head mounted display, and/or the like. In many circumstances, a user may desire to interact with a head mounted display in a manner that avoids potentially cumbersome tactile interactions, avoids fumbling with the head mounted display, permits ongoing activities to continue in parallel with interactions with the head mounted display, permits free use of the user's hands while interacting with the head mounted display, and/or the like. For example, the user may desire to interact with the user's head mounted display by utilizing eye movements, head movements, body movements, and/or the like.

In at least one example embodiment, an apparatus receives information indicative of an eye orientation of the user. For example, the apparatus may receive the information indicative of the eye orientation from at least one memory, from another apparatus, from one or more sensors configured to sense an eye orientation of the user, and/or the like. In at least one example embodiment, information indicative of the eye orientation is eye orientation sensor information. For example, the eye orientation sensor information may provide information indicative of an orientation of the sensed eye, provide an orientation of the sensed eye, and/or the like. In at least one example embodiment, eye orientation sensor information may be information received from an optical sensor, an imaging sensor, a magnetometer sensor, a sensor configured to sense information associated with an orientation of an eye, and/or the like. For example, one or more sensors may be utilized to sense information indicative of an orientation of an eye, an eye orientation, and/or the like. In at least one example embodiment, an apparatus determines an eye orientation of the user. For example, the apparatus may determine, calculate, extrapolate, infer, and/or the like an eye orientation based, at least in part, on the eye orientation sensor information.

In many circumstances, it may be desirable evaluate an eye orientation in relation to a default eye orientation, a natural eye orientation, an eye orientation indicative of lack of intent to allow for display of information on a head mounted display, and/or the like. In at least one example embodiment, an apparatus determines a centered eye orientation based, at least in part, on information indicative of an eye orientation of the user while at least one of the user's eyes is oriented in a primary position of the eye of the user. As discussed previously, the primary position of the eye may be a natural resting position of the eye, a position of the eye associated with the user looking straight ahead, a position of the eye such that the iris is spatially centered within the eye opening, and/or the like. For example, an apparatus may prompt a user of a head mounted display to fixate on a central position on the head mounted display, to fixate on a point beyond the head mounted display that is roughly in line with the user horizontally and vertically, to position their eyes in a natural resting position, and/or the like. In such an example, while the user is following the displayed prompt, the apparatus may sense an eye orientation associated with the eye orientation of the user and/or determine a centered eye orientation based on the information indicative of the orientation of the user's eye.

In order to facilitate display of information on a head mounted display primarily when a user of the head mounted display desires the display of such information, it may be desirable to display such information primarily upon receipt of a clear indication of user desire to have such information displayed. For example, a user may desire to avoid display of information based on natural body motions, unconscious eye movements, everyday activities, and/or the like. The user may desire to limit display of information to circumstances in which the received input unambiguously correlates with an intention to allow for display of information and to avoid accidental display of information based on unintentional inputs. For example, the user may desire to have display of information on a head mounted display to be based, at least in part, on an eye orientation that is extreme in direction, extreme in magnitude, at or near a limit associated with eye motion in a specific direction, and/or the like. In the manner, the user may avoid unintentionally actuating display of information since the extreme eye orientations may not frequently occur during natural movements, natural interactions, and/or the like. In at least one example embodiment, an apparatus determines whether a difference between an eye orientation and a centered eye orientation exceeds a threshold eye orientation difference. In such an example embodiment, the threshold eye orientation difference may be an amount of difference between the eye orientation and the centered eye orientation beyond which it may be desirable to infer an intent of a user. In at least one example embodiment, the apparatus determines a threshold eye orientation difference based, at least in part, on an eye orientation and a centered eye orientation.

In some circumstances, a user may desire that ability to train and/or set the threshold eye orientation difference. For example, one user may have a more limited ocular range of motion when compared to a different user's ocular range of motion. In such an example, a user may desire to set a custom tailored threshold eye orientation difference. For example, an apparatus may prompt a user of a head mounted display to fixate on a central position on the head mounted display and prompt the user to look in various directions, the apparatus may prompt the user of to roll the user's eyes, and/or the like. In such an example, while the user is following the displayed prompt, the apparatus may sense one or more eye orientations associated with the eye orientation of the user and/or determine one or more broadly applicable threshold eye orientation differences, one or more threshold eye orientation differences for each respective eye deviation direction, and/or the like, based on the information indicative of the orientation of the user's eye.

In at least one example embodiment, an apparatus receives information indicative of a head orientation of the user. For example, the apparatus may receive the information indicative of the head orientation from at least one memory, from another apparatus, from one or more sensors configured to sense a head orientation of the user, and/or the like. In at least one example embodiment, information indicative of the head orientation is head orientation sensor information. For example, the head orientation sensor information may provide information indicative of an orientation of the sensed head, provide an orientation of the sensed head, and/or the like. In at least one example embodiment, head orientation sensor information may be information received from a magnetometer sensor, a gyroscope sensor, an accelerometer sensor, an orientation sensor, a myoelectric sensor, an optical sensor, an imaging sensor, a sensor configured to sense information associated with an orientation of a head, and/or the like. For example, one or more sensors may be utilized to sense information indicative of an orientation of a head, a head orientation, and/or the like. In at least one example embodiment, an apparatus determines a head orientation of the user. For example, the apparatus may determine, calculate, extrapolate, infer, and/or the like a head orientation based, at least in part, on the head orientation sensor information.

In many circumstances, it may be desirable evaluate a head orientation in relation to a default head orientation, a natural head orientation, a head orientation indicative of lack of intent to allow for display of information on a head mounted display, and/or the like. In at least one example embodiment, an apparatus determines an anatomical position head orientation based, at least in part, on information indicative of a head orientation of the user while the user is positioned in an anatomical position, while the user's head is positioned in an anatomical position head orientation, and/or the like. As discussed previously, the anatomical position head orientation is an orientation of the head such that the head and neck are erect and the head is facing directly forward of the user's body. For example, an apparatus may prompt a user of a head mounted display to position the user's head in an anatomical position head orientation, to face straight forward, to erect the user's head and/or neck, and/or the like. In such an example, while the user is following the displayed prompt, the apparatus may sense a head orientation associated with the head orientation of the user and/or determine an anatomical position head orientation based, at least in part, on the information indicative of the orientation of the user's head.

As discussed previously, in order to facilitate display of information on a head mounted display primarily when a user of the head mounted display desires the display of such information, it may be desirable to display such information primarily upon receipt of a clear indication of user desire to have such information displayed. For example, a user may desire to avoid display of information based on natural head motions, unconscious neck movements, everyday activities, and/or the like. The user may desire to limit display of information to circumstances in which the received input highly correlates with an intention to allow for display of information and to avoid accidental display of information based on unintentional inputs. For example, the user may desire to have display of information on a head mounted display to be based, at least in part, on a head orientation that is extreme in direction, extreme in magnitude, at or near a limit associated with head movement in a specific direction, and/or the like. In the manner, the user may avoid unintentionally actuating display of information since the extreme head orientations may not frequently occur during natural movements, natural interactions, and/or the like. In at least one example embodiment, an apparatus determines whether a difference between a head orientation and an anatomical position head orientation exceeds a threshold head orientation difference. In such an example embodiment, the threshold head orientation difference may be an amount of difference between the head orientation and the anatomical position head orientation beyond which it may be desirable to infer an intent of a user. In at least one example embodiment, the apparatus determines a threshold head orientation difference based, at least in part, on a head orientation and an anatomical position head orientation.

In some circumstances, a user of a head mounted display may desire to further limit display of information on a head mounted display such that unintentional and/or accidental actuation is even less likely. For example, the user may desire to limit display of information based, at least in part, on compound eye movements, compound head movements, and/or the like. In at least one example embodiment, an apparatus causes display of a representation of information on a head mounted display based, at least in part, on a determination that an eye orientation exceeds a threshold eye orientation difference from a centered eye orientation and a determination that a head orientation exceeds a threshold head orientation difference from an anatomical position head orientation. In at least one example, an apparatus causes display of a representation of information on a head mounted display based, at least in part, on a determination that an eye orientation exceeds a threshold eye orientation difference from a centered eye orientation concurrently with a determination that a head orientation exceeds a threshold head orientation difference from an anatomical position head orientation. For example, if a user desires to have an apparatus cause display of information on a head mounted display, the user may indicate a clear desire and/or a clear intention to have such information displayed. In such a manner, accidental or unintentional causation of display of information may be more readily avoided. For example, the user may avoid having information displayed on the user's head mounted display in potentially dangerous situations, such as while the user is driving a vehicle, in potentially awkward situations, such as while the user is interacting with others in a social setting, and/or the like.

In some circumstances, a user may desire to have information displayed on a head mounted display in a manner that is comfortable, avoids extended unnatural positioning, avoids uncomfortable viewing angles, and/or the like. For example, a user may desire to actuate display of information by positioning her or his eyes in an eye orientation concurrently with positioning his or her head in a head orientation, but subsequently desire to view the displayed information in a manner that is more comfortable for the user, that allows for a more natural eye orientation, that allows for a more natural head orientation, and/or the like.

In at least one example embodiment, an apparatus determines that an eye orientation of a user indicates that a part of a representation of information displayed at a position on the head mounted display has been fixated upon by the user for a duration that exceeds a threshold information fixation duration. In such an example embodiment, the user may indicate an intent to have the information displayed at a position on the head mounted display that allows for more natural viewing of the information. In at least one example embodiment, a threshold information fixation duration may be an amount of time at least a part of a representation of information must be fixated upon prior to repositioning of the information on the head mounted display. In at least one example embodiment, an apparatus causes display of a part of a representation of information at a position that is closer to a center position on a head mounted display, causes display of a part of a representation of information at a center position on a head mounted display, and/or the like. A center position of a head mounted display may be a position on the display that is at the center of a field of view of a user when the user's eyes are oriented in a centered eye orientation.

In some circumstances, a user may desire to view a smooth transition of display of information at a position on a head mounted display to display of the information at a different position on the head mounted display. For example, the user may desire display of the information to move fluidly from the position to the different position in such a way that allows for the user to naturally and comfortably follow the repositioning of the information, to continue viewing of the information during the repositioning, and/or the like. In at least one example embodiment, an apparatus causes display of an animation indicating progression of display of a representation of a part of information from a position to a different position on a head mounted display, to another position that is closer to a center position of a head mounted display, to a center position on a head mounted display, and/or the like. In order to facilitate such a fluid repositioning of the information on the head mounted display, a user may desire to have display of the information terminated at the position and caused to be displayed at the different position, at another position that is closer to a center position, at a center position, and/or the like. In at least one example embodiment, an apparatus causes termination of display of at least a part of a representation of information at a position on a head mounted display.

FIG. 5A is a diagram illustrating see through display 502 according to at least one example embodiment. In at least one example embodiment, displaying information on a see through display so that the information corresponds with one or more objects viewable through the see through display is referred to as augmented reality. In the example of FIG. 5A, user 501 may perceive objects 505 and 506 through see through display 502. In at least one example embodiment, the see through display may display information to the user. For example, display 502 may display information 503 and information 504. Information 503 and information 504 may be positioned on display 502 such that the information corresponds with one or more objects viewable through see through display 502, such as object 505. In such an example, information 503 may be associated with, identify, and/or the like, object 505. For example, information 503 may indicate an identity of object 505. In at least one example embodiment, display 502 may be comprised by a head mounted display.

In the example of FIG. 5A, information 503 may be a representation of information caused to be displayed on see through display 502. For example, user 501 may have oriented his or her eyes in an eye orientation and positioned his or her head in a head orientation that corresponds with information 503. In the example of FIG. 5A, information 504 may be a representation of different information caused to be displayed on see through display 502. For example, user 501 may have oriented his or her eyes in a different eye orientation and/or positioned his or her head in a different head orientation that corresponds with information 504. In the example of FIG. 5A, user 501 may fixate on information 503 and/or information 504 for an amount of time that exceeds a threshold information fixation duration, resulting in repositioning of the respective information to a position closer to the center of see through display 502, at the center of see through display 502, at a position on see through display 502 that corresponds with a centered eye position of user 501, and/or the like.

In some circumstances, information displayed on a see through display may obscure one or more objects from the user when perceived through the see through display. In at least one example embodiment, obscurance may be causation of obscuring. For example, display of information 503 on display 502 may cause obscurance of the display area of display 502 associated with information 503. In this manner, information 503 may be associated with obscurance of a display area associated with the see through display.

FIG. 5B is a diagram illustrating a see through display according to at least one example embodiment. In at least one example embodiment, a see through display is a near eye display. A near eye display may be a see through display that is positioned proximate to an eye of the user. The example of FIG. 5B illustrates glasses that comprise a near eye display in each lens. In the example of FIG. 5B, the right near eye display is displaying information 513A and 514A, and the left near eye display is displaying information 513B and 514B. In at least one example embodiment, information 513A may be associated with information 513B. For example, the content of information 513A may be identical to content of information 513B. In some circumstances, even though the content may be identical between 513A and 513B, position of information 513A on the right near eye display may vary from position of information 513B on the left near eye display. In this manner, the apparatus may vary position of information between the left near eye display and right near eye display to vary the parallax of the information perceived by the user. In this manner, the apparatus may vary the perceived depth of the information by the user.

In the example of FIG. 5B, information 514A and 514B may be a representation of information caused to be displayed on the two respective see through displays of the head mounted display depicted. For example, information 514A and 514B may be displayed on the head mounted display based, at least in part, on a user of the head mounted display having oriented his or her eyes in an eye orientation and positioned his or her head in a head orientation that corresponds with information 514A and/or 514B. In the example of FIG. 5B, information 513A and 513B may be a representation of different information caused to be displayed on the two respective see through displays of the head mounted display depicted. For example, information 513A and 513B may be displayed on the head mounted display based, at least in part, on a user of the head mounted display having oriented his or her eyes in an eye orientation and positioned his or her head in a head orientation that corresponds with information 513A and/or 513B. In the example of FIG. 5B, a user may fixate on information 513A, 513B, 514A, and/or 514B for an amount of time that exceeds a threshold information fixation duration, resulting in repositioning of the respective information to a position closer to the center of a see through display of the head mounted display, at the center of a see through display of the head mounted display, at a position on a see through display of the head mounted display that corresponds with a centered eye position of a user, and/or the like.

Figure 6:
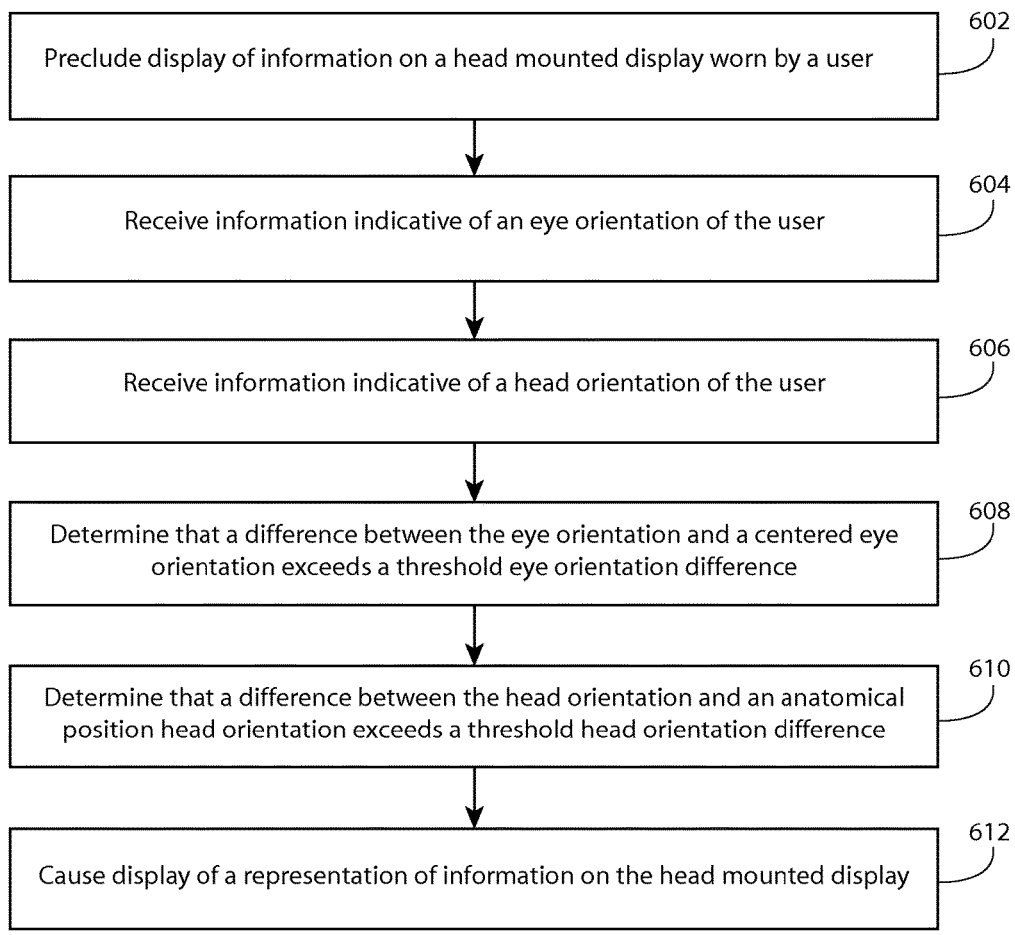
FIG. 6 is a flow diagram illustrating activities associated with causing display of a representation of information on a head mounted display according to at least one example embodiment.

FIG. 6 is a flow diagram illustrating activities associated with causing display of a representation of information on a head mounted display according to at least one example embodiment. In at least one example embodiment, there is a set of operations that corresponds with the activities of FIG. 6. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 6.

At block 602, the apparatus precludes display of information on a head mounted display worn by a user. The display, the preclusion of display, the information, the head mounted display, and the user may be similar as described regarding FIG. 2 and FIGS. 5A-5B.

At block 604, the apparatus receives information indicative of an eye orientation of the user. The receipt, the eye orientation of the user, and the information indicative of the eye orientation of the user may be similar as described regarding FIGS. 4A-4E and FIGS. 5A-5B.

At block 606, the apparatus receives information indicative of a head orientation of the user. The receipt, the head orientation of the user, and the information indicative of the head orientation of the user may be similar as described regarding FIGS. 3A-3D and FIGS. 5A-5B.

At block 608, the apparatus determines that a difference between the eye orientation and a centered eye orientation exceeds a threshold eye orientation difference. The determination, the centered eye orientation, the difference between the eye orientation and the centered eye orientation, and the threshold eye orientation difference may be similar as described regarding FIGS. 4A-4E and FIGS. 5A-5B.

At block 610, the apparatus determines that a difference between the head orientation and an anatomical position head orientation exceeds a threshold head orientation difference. The determination, the anatomical position head orientation, the difference between the head orientation and the anatomical position head orientation, and the threshold head orientation difference may be similar as described regarding FIGS. 3A-3D and FIGS. 5A-5B.

At block 612, the apparatus causes display of a representation of information on the head mounted display based, at least in part, on the determination that the eye orientation exceeds the threshold eye orientation difference from the centered eye orientation and the determination that the head orientation exceeds the threshold head orientation difference from the anatomical position head orientation. The display, the causation of display, and the representation of information may be similar as described regarding FIGS. 5A-5B and FIGS. 9A-9C.

Figure 7:
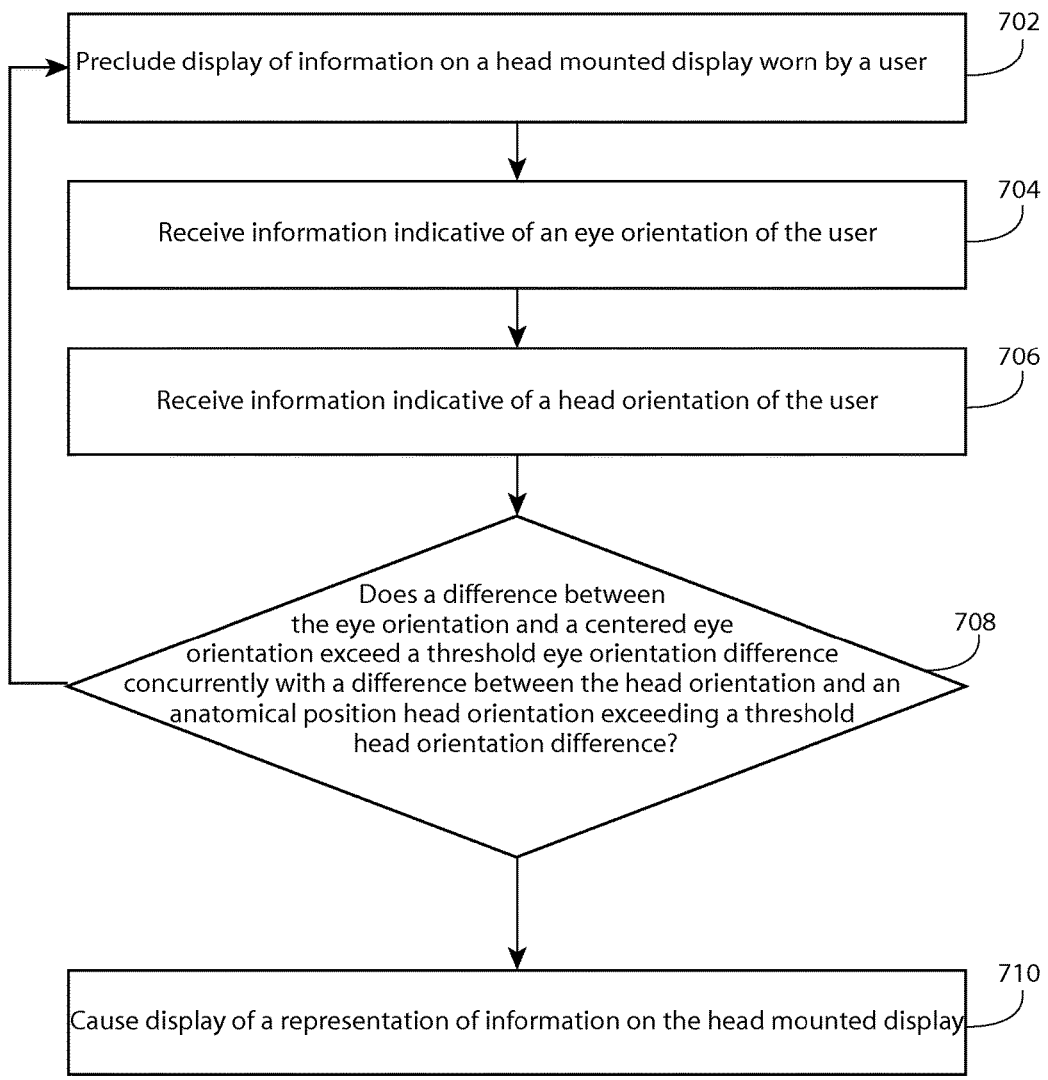
FIG. 7 is a flow diagram illustrating activities associated with causing display of a representation of information on a head mounted display according to at least one example embodiment.

FIG. 7 is a flow diagram illustrating activities associated with causing display of a representation of information on a head mounted display according to at least one example embodiment. In at least one example embodiment, there is a set of operations that corresponds with the activities of FIG. 7. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 7.

As discussed previously, in some circumstances, it may be desirable to preclude display of information on a head mounted display until receipt of information indicative of a clear intent of a user to perform an input associated with display of information. For example, it may be desirable to permit display of information based, at least in part, on two concurrent inputs that may not be prone to unintentional and/or accidental triggering.

At block 702, the apparatus precludes display of information on a head mounted display worn by a user. The display, the preclusion of display, the information, the head mounted display, and the user may be similar as described regarding FIG. 2 and FIGS. 5A-5B.

At block 704, the apparatus receives information indicative of an eye orientation of the user. The receipt, the eye orientation of the user, and the information indicative of the eye orientation of the user may be similar as described regarding FIGS. 4A-4E and FIGS. 5A-5B.

At block 706, the apparatus receives information indicative of a head orientation of the user. The receipt, the head orientation of the user, and the information indicative of the head orientation of the user may be similar as described regarding FIGS. 3A-3D and FIGS. 5A-5B.

At block 708, the apparatus determines whether the eye orientation exceeds the threshold eye orientation difference from the centered eye orientation concurrently with the head orientation exceeding the threshold head orientation difference from the anatomical position head orientation. If the apparatus determines that the eye orientation exceeds the threshold eye orientation difference from the centered eye orientation concurrently with the head orientation exceeding the threshold head orientation difference from the anatomical position head orientation, then flow proceeds to block 710. If the apparatus determines that the eye orientation fails to exceed the threshold eye orientation difference from the centered eye orientation concurrently with the head orientation exceeding the threshold head orientation difference from the anatomical position head orientation, then flow returns to block 702. The determination, the centered eye orientation, the difference between the eye orientation and the centered eye orientation, the threshold eye orientation difference, the anatomical position head orientation, the difference between the head orientation and the anatomical position head orientation, and the threshold head orientation difference may be similar as described regarding FIGS. 3A-3D, FIGS. 4A-4E, and FIGS. 5A-5B.

At block 710, the apparatus causes display of a representation of information on the head mounted display based, at least in part, on the determination that the eye orientation exceeds the threshold eye orientation difference from the centered eye orientation, the determination that the head orientation exceeds the threshold head orientation difference from the anatomical position head orientation, and the determination that the eye orientation exceeds the threshold eye orientation difference from the centered eye orientation concurrently with the head orientation exceeding the threshold head orientation difference from the anatomical position head orientation. The display, the causation of display, and the representation of information may be similar as described regarding FIGS. 5A-5B and FIGS. 9A-9C.

Figure 8:
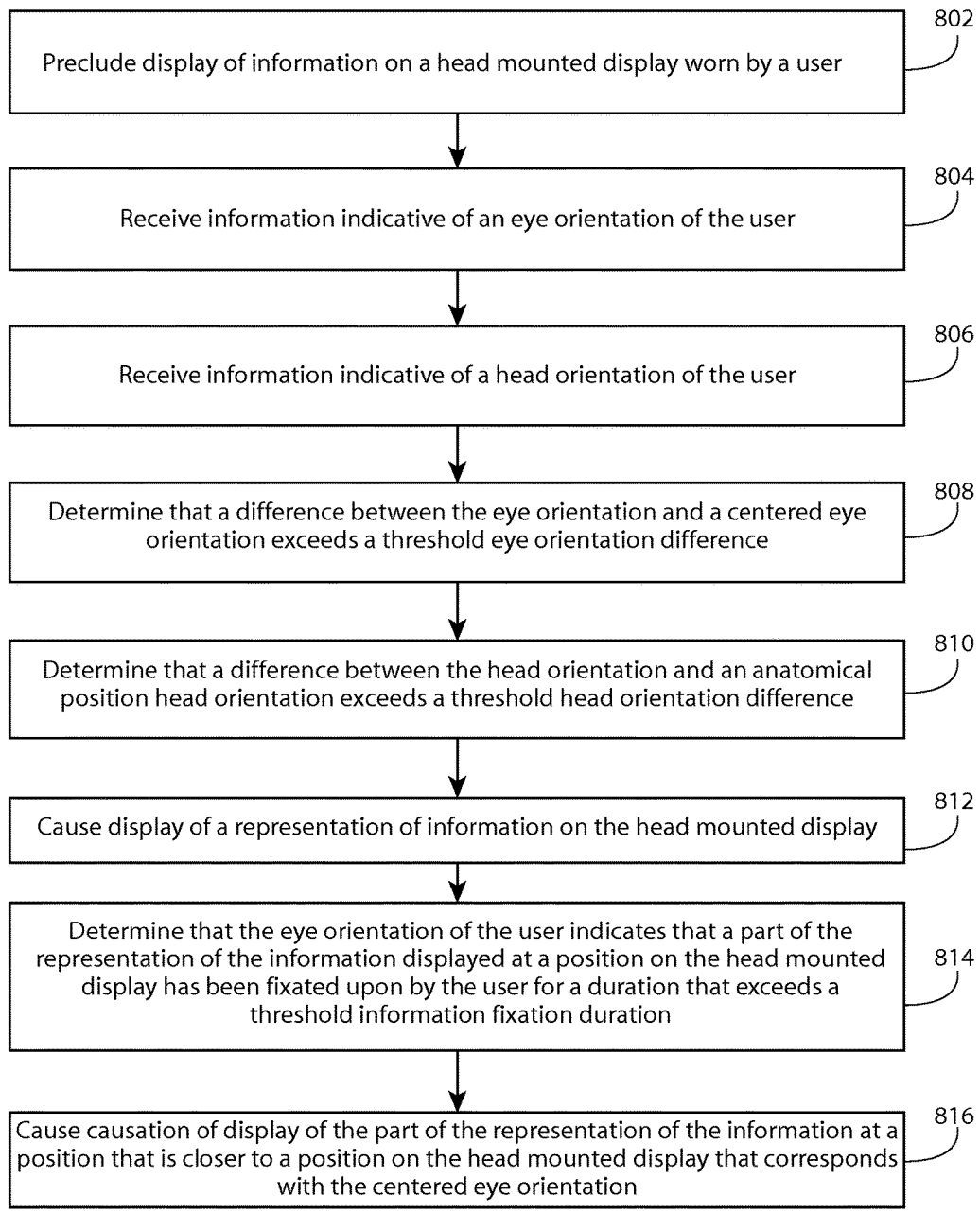
FIG. 8 is a flow diagram illustrating activities associated with causing display of a representation of information on a head mounted display at a position that is closer to a position on the head mounted display that corresponds with a centered eye orientation according to at least one example embodiment.

FIG. 8 is a flow diagram illustrating activities associated with causing display of a representation of information on a head mounted display at a position that is closer to a position on the head mounted display that corresponds with a centered eye orientation according to at least one example embodiment. In at least one example embodiment, there is a set of operations that corresponds with the activities of FIG. 8. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 8.

As previously discussed, in some circumstances, it may be desirable to migrate display of a representation of information from a first position to a second position on a head mounted display. For example, it may be desirable to migrate the display of the representation of the information to the second position on the head mounted display in order to provide a more natural viewing angle to a user, in order to enhance a display characteristic associated with the representation of the information, and/or the like.

At block 802, the apparatus precludes display of information on a head mounted display worn by a user. The display, the preclusion of display, the information, the head mounted display, and the user may be similar as described regarding FIG. 2 and FIGS. 5A-5B.

At block 804, the apparatus receives information indicative of an eye orientation of the user. The receipt, the eye orientation of the user, and the information indicative of the eye orientation of the user may be similar as described regarding FIGS. 4A-4E and FIGS. 5A-5B.

At block 806, the apparatus receives information indicative of a head orientation of the user. The receipt, the head orientation of the user, and the information indicative of the head orientation of the user may be similar as described regarding FIGS. 3A-3D and FIGS. 5A-5B.

At block 808, the apparatus determines that a difference between the eye orientation and a centered eye orientation exceeds a threshold eye orientation difference. The determination, the centered eye orientation, the difference between the eye orientation and the centered eye orientation, and the threshold eye orientation difference may be similar as described regarding FIGS. 4A-4E and FIGS. 5A-5B.

At block 810, the apparatus determines that a difference between the head orientation and an anatomical position head orientation exceeds a threshold head orientation difference. The determination, the anatomical position head orientation, the difference between the head orientation and the anatomical position head orientation, and the threshold head orientation difference may be similar as described regarding FIGS. 3A-3D and FIGS. 5A-5B.

At block 812, the apparatus causes display of a representation of information on the head mounted display based, at least in part, on the determination that the eye orientation exceeds the threshold eye orientation difference from the centered eye orientation and the determination that the head orientation exceeds the threshold head orientation difference from the anatomical position head orientation. The display, the causation of display, and the representation of information may be similar as described regarding FIGS. 5A-5B and FIGS. 9A-9C.

At block 814, the apparatus determines that the eye orientation of the user indicates that a part of the representation of the information displayed at a position on the head mounted display has been fixated upon by the user for a duration that exceeds a threshold information fixation duration. The determination, the part of the representation of the information, the display of the part of the representation of the information at the position on the head mounted display, the fixation upon the part of the representation of the information, the duration of fixation, and the threshold information fixation duration may be similar as described regarding FIGS. 4A-4E and FIGS. 5A-5B.

At block 816, the apparatus causes display of the part of the representation of the information at a position that is closer to a center position on the head mounted display that corresponds with the centered eye orientation. The center position on the head mounted display, the correspondence of the center position on the head mounted display and the centered eye orientation, and the display of the part of the representation of the information at the position that is closer to the center position on the head mounted display may be similar as described regarding FIGS. 4A-4E and FIGS. 5A-5B.

FIGS. 9A-9C are diagrams illustrating information correlation tables according to at least one example embodiment. The examples of FIGS. 9A-9C are merely examples and do not limit the scope of the claims. For example, information may vary, information correlation may vary, information correlation table format may vary, and/or the like.

In many circumstances, a user may desire to have various information displayed on a head mounted display. For example, the user may desire to check for notifications, read emails, view traffic information, refer to weather information, and/or the like. As such actuation of display of information on a head mounted display, the user may desire to cause display of specific information in a manner that avoids potentially cumbersome tactile interactions, avoids fumbling with the head mounted display, permits ongoing activities to continue in parallel with interactions with the head mounted display, permits free use of the user's hands while interacting with the head mounted display, and/or the like.

In at least one example embodiment, an apparatus determines information for display on a head mounted display based, at least in part, on an eye deviation direction. An eye deviation direction may be a direction from which an eye orientation differs from a centered eye orientation, similar as described regarding FIGS. 4A-4E. In at least one example embodiment, determination that an eye orientation exceeds a threshold eye orientation difference from a centered eye orientation comprises determination that the eye orientation differs from the centered eye orientation in an eye deviation direction from the centered eye orientation. For example, a user may orient his or her eyes such that the resulting eye orientation exceeds the threshold eye orientation difference in a specific eye deviation direction that corresponds with a particular piece of information that the user desires to have displayed. For example, the eye orientation of the user may be within an eye orientation tolerance such that the eye orientation is determined to be in the eye deviation direction that corresponds with the particular piece of information. The eye orientation tolerance may, for example, permit inference of an intended eye deviation direction based on an eye orientation falling within a specific range of values associated with the eye deviation direction.

In at least one example embodiment, an apparatus determines information for display on a head mounted display based, at least in part, on a head orientation classification. A head orientation classification may identify an orientation of a head with respect to an anatomical position head orientation, similar as described regarding FIGS. 3A-3D. In at least one example embodiment, determination that a head orientation exceeds a threshold head orientation difference from an anatomical position head orientation comprises determination that the head orientation corresponds with a head orientation classification. For example, a user may orient his or her head such that the resulting head orientation exceeds the threshold head orientation difference corresponding with a specific head orientation classification that corresponds with a particular piece of information that the user desires to have displayed.

FIG. 9A is a diagram illustrating an information correlation table according to at least one example embodiment. In the example of FIG. 9A, an information correlation table correlating head orientation classifications with information is depicted. In the example of FIG. 9A, head orientation classification 902 correlates with information 912, head orientation classification 904 correlates with information 914, head orientation classification 906 correlates with information 916, and head orientation classification 908 correlates with information 918. Each of head orientation classifications 902, 904, 906, and 908 may identify a specific head orientation, such as a head orientation associated with a leftward lateral rotation of a head and/or neck of a user, a rearward deviation of the head and/or neck of the user, a rightward lateral flexion together with extension of the head and/or neck of the user, and/or the like. Each of information 912, 914, 916, and 918 may comprise a representation of the respective information, a display position of the respective information in relation to a head mounted display, and/or the like. In the example of FIG. 9A, a user orienting the user's head in according with head orientation classification 902 may indicate a desire to cause display of information 912 on a head mounted display worn by the user.

FIG. 9B is a diagram illustrating an information correlation table according to at least one example embodiment. In the example of FIG. 9B, an information correlation table correlating eye deviation directions with information is depicted. In the example of FIG. 9B, eye deviation direction 922 correlates with information 932, eye deviation direction 924 correlates with information 934, eye deviation direction 926 correlates with information 936, and eye deviation direction 928 correlates with information 938. Each of eye deviation directions 922, 924, 926, and 928 may identify a specific eye orientation, such as an eye orientation associated with depression from a centered eye orientation, an eye orientation associated with abduction from the centered eye orientation, an eye orientation associated with elevation and adduction from the centered eye orientation, and/or the like. Each of information 932, 934, 936, and 938 may comprise a representation of the respective information, a display position of the respective information in relation to a head mounted display, and/or the like. In the example of FIG. 9B, a user orienting the user's eyes in accordance with eye deviation direction 932 may indicate a desire to cause display of information 932 on a head mounted display worn by the user.

FIG. 9C is a diagram illustrating an information correlation table according to at least one example embodiment. In the example of FIG. 9C, an information correlation table correlating head orientation classifications and eye deviation directions with information is depicted. In the example of FIG. 9C, head orientation classification 942 and eye deviation direction 952 correlate with information 962, head orientation classification 942 and eye deviation direction 954 correlate with information 964, head orientation classification 944 and eye deviation direction 952 correlate with information 966, and head orientation classification 944 and eye deviation direction 954 correlate with information 968. In this manner, a single head orientation classification may correlate with multiple information, wherein the correlation with a specific information is further based, at least in part, on the associated eye deviation direction indicated in the information correlation table. Similarly, a single eye deviation direction may correlate with multiple information, wherein the correlation with a specific information is further based, at least in part, on the associated head orientation classification indicated in the information correlation table. In the example of FIG. 9C, a user orienting the user's head in according with head orientation classification 942 and orienting the user's eyes in accordance with eye deviation direction 952 may indicate a desire to cause display of information 962 on a head mounted display worn by the user.

Figure 10:
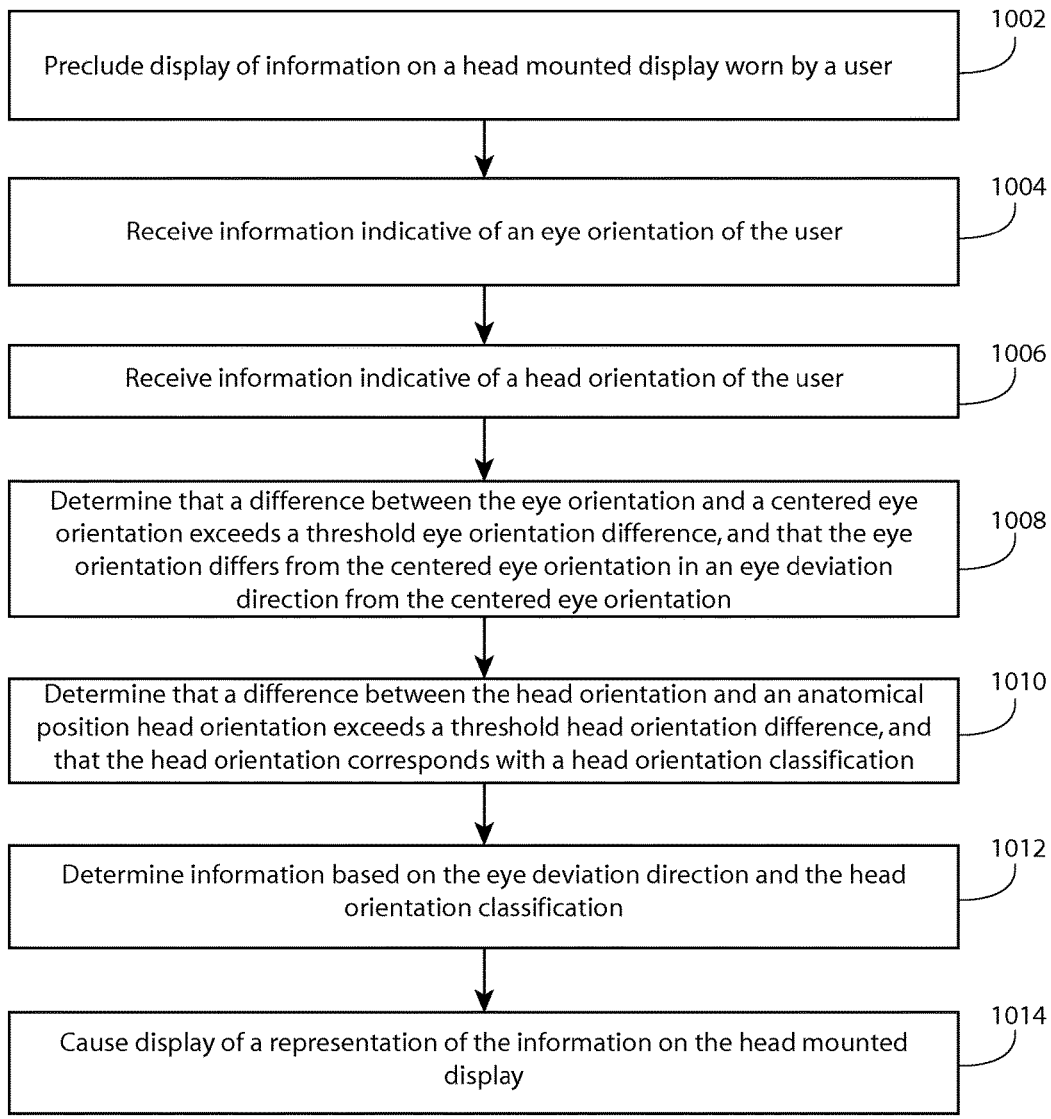
FIG. 10 is a flow diagram illustrating activities associated with causing display of a representation of information on a head mounted display according to at least one example embodiment.

FIG. 10 is a flow diagram illustrating activities associated with causing display of a representation of information on a head mounted display according to at least one example embodiment. In at least one example embodiment, there is a set of operations that corresponds with the activities of FIG. 10. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 10.

As discussed previously, in some circumstances, a user may desire to display information based, at least in part, on an eye deviation direction and/or a head orientation classification. For example, a user may desire to have information associated with a particular eye deviation direction and/or a particular head orientation classification such that the information is caused to be displayed based, at least in part, on the user's eye orientation corresponding with the particular eye deviation direction and the user's head orientation corresponding with the particular head orientation classification.

At block 1002, the apparatus precludes display of information on a head mounted display worn by a user. The display, the preclusion of display, the information, the head mounted display, and the user may be similar as described regarding FIG. 2 and FIGS. 5A-5B.

At block 1004, the apparatus receives information indicative of an eye orientation of the user. The receipt, the eye orientation of the user, and the information indicative of the eye orientation of the user may be similar as described regarding FIGS. 4A-4E and FIGS. 5A-5B.

At block 1006, the apparatus receives information indicative of a head orientation of the user. The receipt, the head orientation of the user, and the information indicative of the head orientation of the user may be similar as described regarding FIGS. 3A-3D and FIGS. 5A-5B.

At block 1008, the apparatus determines that a difference between the eye orientation and a centered eye orientation exceeds a threshold eye orientation difference, and that the eye orientation differs from the centered eye orientation in an eye deviation direction from the centered eye orientation. The determination, the centered eye orientation, the difference between the eye orientation and the centered eye orientation, the threshold eye orientation difference, and the eye deviation direction from the centered eye orientation may be similar as described regarding FIGS. 4A-4E, FIGS. 5A-5B, and FIGS. 9A-9C.

At block 1010, the apparatus determines that a difference between the head orientation and an anatomical position head orientation exceeds a threshold head orientation difference, and that the head orientation corresponds with a head orientation classification. The determination, the anatomical position head orientation, the difference between the head orientation and the anatomical position head orientation, the threshold head orientation difference, the head orientation classification, and the correspondence between the head orientation and the head orientation classification may be similar as described regarding FIGS. 3A-3D, FIGS. 5A-5B, and FIGS. 9A-9C.

At block 1012, the apparatus determines information based, at least in part, on the eye deviation direction and the head orientation classification. The determination and the information may be similar as described regarding FIG. 5A-5B and FIGS. 9A-9C.

At block 1014, the apparatus causes display of a representation of information on the head mounted display based, at least in part, on the determination that the eye orientation exceeds the threshold eye orientation difference from the centered eye orientation and the determination that the head orientation exceeds the threshold head orientation difference from the anatomical position head orientation. The display, the causation of display, and the representation of information may be similar as described regarding FIGS. 5A-5B and FIGS. 9A-9C.

Embodiments of the invention may be implemented in software, hardware, application logic or a combination of software, hardware, and application logic. The software, application logic and/or hardware may reside on the apparatus, a separate device, or a plurality of separate devices. If desired, part of the software, application logic and/or hardware may reside on the apparatus, part of the software, application logic and/or hardware may reside on a separate device, and part of the software, application logic and/or hardware may reside on a plurality of separate devices. In an example embodiment, the application logic, software or an instruction set is maintained on any one of various conventional computer-readable media.

If desired, the different functions discussed herein may be performed in a different order and/or concurrently with each other. For example, block 606 of FIG. 6 may be performed after block 608 of FIG. 6. Furthermore, if desired, one or more of the above-described functions may be optional or may be combined. For example, block 1012 of FIG. 10 may be optional and/or combined with block 1014 of FIG. 10.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are variations and modifications which may be made without departing from the scope of the present invention as defined in the appended claims.

What is claimed is:

1. An apparatus, comprising:
at least one processor; and
at least one memory including computer program code, the memory and the computer program code configured to, working with the processor, cause the apparatus to perform at least the following:
define a central portion and a peripheral portion of a head mounted display, wherein the central portion and the peripheral portion are distinct from each other;
in a first configuration of the head mounted display, preclude display of any information in the central portion of the head mounted display;
while the head mounted display is in the first configuration, receipt of information indicative of an eye orientation of a user of the head mounted display;
while the head mounted display is in the first configuration, receipt of information indicative of a head orientation of the user;
determination that a difference between the eye orientation and a centered eye orientation exceeds a threshold eye orientation difference;
determination that a difference between the head orientation and an anatomical position head orientation exceeds a threshold head orientation difference, wherein the anatomical position head orientation is the orientation of the user's head such that the user's head is facing forwards and the user's neck is erect; and
in response to the determination that the eye orientation exceeds the threshold eye orientation difference from the centered eye orientation while the head orientation exceeds the threshold head orientation difference from the anatomical position head orientation, causation of a change from the first configuration to a second configuration of the head mounted display, wherein in the second configuration, a display of a representation of information in the central portion of the head mounted display is provided.

2. The apparatus of claim 1, wherein the memory comprises computer program code configured to, working with the processor, cause the apparatus to perform determination that the eye orientation exceeds the threshold eye orientation difference from the centered eye orientation concurrently with the head orientation exceeding the threshold head orientation difference from the anatomical position head orientation, wherein the causation of the change from the first configuration to a second configuration of the head mounted display is further based, at least in part, on the determination that the eye orientation exceeds the threshold eye orientation difference from the centered eye orientation concurrently with the head orientation exceeding the threshold head orientation difference from the anatomical position head orientation.

3. The apparatus of claim 1, wherein the memory comprises computer program code configured to, working with the processor, cause the apparatus to perform:
determination that the eye orientation of the user indicates that a part of the representation of the information displayed at a position on the head mounted display has been fixated upon by the user for a duration that exceeds a threshold information fixation duration; and causation of display of the part of the representation of the information at a position that is closer to a center position on the head mounted display that corresponds with the centered eye orientation.

4. The apparatus of claim 3, wherein the memory comprises computer program code configured to, working with the processor, cause the apparatus to perform termination of display of the part of the representation of the information at the position on the head mounted display.

5. The apparatus of claim 3, wherein causation of display of the part of the representation of the information at the position that is closer to the center position on the head mounted display that corresponds with the centered eye orientation comprises causation of display of the part of the representation of the information at the center position on the head mounted display that corresponds with the centered eye orientation.

6. The apparatus of claim 5, wherein the memory comprises computer program code configured to, working with the processor, cause the apparatus to perform causation of display of an animation indicating progression of display of the representation of the part of the information from the position to the center position on the head mounted display.

7. The apparatus of claim 1, wherein the memory comprises computer program code configured to determine that the eye orientation differs from the centered eye orientation in an eye deviation direction from the centered eye orientation, wherein the change from the first configuration to a second configuration of the head mounted display is based on at least the eye deviation direction.

8. The apparatus of claim 1, wherein the memory comprises computer program code configured to determine that the head orientation corresponds with a head orientation classification, wherein the change from the first configuration to a second configuration of the head mounted display is based on at least the head orientation classification.

9. A method comprising:
defining a central portion and a peripheral portion of a head mounted display, wherein the central portion and the peripheral portion are distinct from each other;
in a first configuration of the head mounted display, precluding display of any information in the central portion of the head mounted display;
while the head mounted display is in the first configuration, receiving information indicative of an eye orientation of a user of the head mounted display;
while the head mounted display is in the first configuration, receiving information indicative of a head orientation of the user;
determining that a difference between the eye orientation and a centered eye orientation exceeds a threshold eye orientation difference;
determining that a difference between the head orientation and an anatomical position head orientation exceeds a threshold head orientation difference, wherein the anatomical position head orientation is the orientation of the user's head such that the user's head is facing forwards and the user's neck is erect; and
in response to the determination that the eye orientation exceeds the threshold eye orientation difference from the centered eye orientation while the head orientation exceeds the threshold head orientation difference from the anatomical position head orientation, causation of a change from the first configuration to a second configuration of the head mounted display, wherein in the second configuration, a display of a representation of information in the central portion of the head mounted display is provided.

10. The method of claim 9, further comprising determining that the eye orientation exceeds the threshold eye orientation difference from the centered eye orientation concurrently with the head orientation exceeding the threshold head orientation difference from the anatomical position head orientation, wherein the causation of the change from the first configuration to a second configuration of the head mounted display is further based, at least in part, on the determination that the eye orientation exceeds the threshold eye orientation difference from the centered eye orientation concurrently with the head orientation exceeding the threshold head orientation difference from the anatomical position head orientation.

11. The method of claim 9, further comprising:
determining that the eye orientation of the user indicates that a part of the representation of the information displayed at a position on the head mounted display has been fixated upon by the user for a duration that exceeds a threshold information fixation duration; and
causing display of the part of the representation of the information at a position that is closer to a center position on the head mounted display that corresponds with the centered eye orientation.

12. The method of claim 11, wherein causation of display of the part of the representation of the information at the position that is closer to the center position on the head mounted display that corresponds with the centered eye orientation comprises causation of display of the part of the representation of the information at the center position on the head mounted display that corresponds with the centered eye orientation.

13. The method of claim 12, further comprising causing display of an animation indicating progression of display of the representation of the part of the information from the position to the center position on the head mounted display.

14. The method of claim 9, further comprising determining that the eye orientation differs from the centered eye orientation in an eye deviation direction from the centered eye orientation, wherein the change from the first configuration to a second configuration of the head mounted display is based on at least the eye deviation direction.

15. The method of claim 9, further comprising determining that the head orientation corresponds with a head orientation classification, wherein the change from the first configuration to a second configuration of the head mounted display is based on at least the head orientation classification.

16. At least one non-transitory computer-readable medium encoded with instructions that, when executed by a processor, perform:
defining a central portion and a peripheral portion of a head mounted display, wherein the central portion and the peripheral portion are distinct from each other;
in a first configuration of the head mounted display, precluding display of any information in the central portion of the head mounted display;
while the head mounted display is in the first configuration, receiving information indicative of an eye orientation of a user of the head mounted display;
while the head mounted display is in the first configuration, receiving information indicative of a head orientation of the user;

determining that a difference between the eye orientation and a centered eye orientation exceeds a threshold eye orientation difference;

determining that a difference between the head orientation and an anatomical position head orientation exceeds a threshold head orientation difference, wherein the anatomical position head orientation is the orientation of the user's head such that the user's head is facing forwards and the user's neck is erect; and in response to the determination that the eye orientation exceeds the threshold eye orientation difference from the centered eye orientation while the head orientation exceeds the threshold head orientation difference from the anatomical position head orientation, causation of a change from the first configuration to a second configuration of the head mounted display, wherein in the second configuration, a display of a representation of information in the central portion of the head mounted display is provided.

17. The medium of claim 16, further encoded with instructions that, when executed by the processor, perform determining that the eye orientation exceeds the threshold eye orientation difference from the centered eye orientation concurrently with the head orientation exceeding the threshold head orientation difference from the anatomical position head orientation, wherein the causation of the change from the first configuration to a second configuration of the head mounted display is further based, at least in part, on the determination that the eye orientation exceeds the threshold eye orientation difference from the centered eye orientation concurrently with the head orientation exceeding the threshold head orientation difference from the anatomical position head orientation.

18. The medium of claim 16, further encoded with instructions that, when executed by the processor, perform determining that the eye orientation differs from the centered eye orientation in an eye deviation direction from the centered eye orientation, wherein the change from the first configuration to a second configuration of the head mounted display is based on at least the eye deviation direction.

19. The medium of claim 16, further encoded with instructions that, when executed by the processor, perform determining that the head orientation corresponds with a head orientation classification, wherein the change from the first configuration to a second configuration of the head mounted display is based on at least the head orientation classification.

* * * * *